US012631837B2

(12) United States Patent
Elsherbini et al.

(10) Patent No.: US 12,631,837 B2
(45) Date of Patent: May 19, 2026

(54) PHOTONIC QUASI-MONOLITHIC DIE ARCHITECTURES

(71) Applicant: Intel Corporation, Santa Clara, CA (US)

(72) Inventors: Adel A. Elsherbini, Chandler, AZ (US); David Hui, Santa Clara, CA (US); Haris Khan Niazi, Scottsdale, AZ (US); Wenhao Li, Chandler, AZ (US); Bhaskar Jyoti Krishnatreya, Hillsboro, OR (US); Henning Braunisch, Phoenix, AZ (US); Shawna M. Liff, Scottsdale, AZ (US); Jiraporn Seangatith, Chandler, AZ (US); Johanna M. Swan, Scottsdale, AZ (US); Krishna Vasanth Valavala, Chandler, AZ (US); Xavier Francois Brun, Hillsboro, OR (US); Feras Eid, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/821,019

(22) Filed: Aug. 19, 2022

(65) Prior Publication Data

US 2024/0061194 A1     Feb. 22, 2024

(51) Int. Cl.
*G02B 6/42*          (2006.01)

(52) U.S. Cl.
CPC ......... *G02B 6/4274* (2013.01); *G02B 6/4204* (2013.01)

(58) Field of Classification Search
CPC ........................... G02B 6/4274; G02B 6/4204
See application file for complete search history.

(56) References Cited

U.S. PATENT DOCUMENTS

| | | | |
|---|---|---|---|
| 10,062,652 B2 | 8/2018 | Lee et al. | |
| 10,598,875 B2 | 3/2020 | Xie | |

(Continued)

FOREIGN PATENT DOCUMENTS

| | | |
|---|---|---|
| CN | 113035801 A | 6/2021 |
| EP | 3772098 A1 | 2/2021 |

OTHER PUBLICATIONS

U.S. Appl. No. 17/891,530, filed Aug. 19, 2022, Adel A. Elsherbini.

(Continued)

*Primary Examiner* — Uyen Chau N Le
*Assistant Examiner* — Hoang Q Tran
(74) *Attorney, Agent, or Firm* — Akona IP PC

(57)          ABSTRACT

Microelectronic assemblies, related devices and methods, are disclosed herein. In some embodiments, a microelectronic assembly may include an interconnect die in a first layer surrounded by a dielectric material; a processor integrated circuit (processor IC) and an integrated circuit (IC) in a second layer, the second layer on the first layer, wherein the interconnect die is electrically coupled to the processor IC and the IC by first interconnects having a pitch of less than 10 microns between adjacent first interconnects; a photonic integrated circuit (PIC) and a substrate in a third layer, the third layer on the second layer, wherein the PIC has an active surface, and wherein the active surface of the PIC is coupled to the IC by second interconnects having a pitch of less than 10 microns between adjacent second interconnects; and a fiber connector optically coupled to the active surface of the PIC.

20 Claims, 21 Drawing Sheets

(56)      References Cited

U.S. PATENT DOCUMENTS

| | | |
|---|---|---|
| 10,957,670 B2 | 3/2021 | Kim et al. |
| 11,694,959 B2 | 7/2023 | Ganesan et al. |
| 2004/0018696 A1 | 1/2004 | Wieczorek et al. |
| 2007/0086168 A1 | 4/2007 | Khanna et al. |
| 2013/0249085 A1 | 9/2013 | Ide |
| 2015/0318246 A1 | 11/2015 | Yu et al. |
| 2016/0099214 A1 | 4/2016 | Dalal et al. |
| 2016/0260685 A1 | 9/2016 | Tremlett et al. |
| 2018/0061775 A1 | 3/2018 | Velez et al. |
| 2019/0131242 A1 | 5/2019 | Lee et al. |
| 2020/0118973 A1 | 4/2020 | Wang et al. |
| 2020/0321257 A1 | 10/2020 | Kang et al. |
| 2021/0028080 A1 | 1/2021 | Pietambaram et al. |
| 2021/0035911 A1 | 2/2021 | Ganesan et al. |
| 2021/0082855 A1 | 3/2021 | Chen et al. |
| 2021/0091056 A1* | 3/2021 | Yu .......................... G02B 6/4214 |
| 2021/0096311 A1* | 4/2021 | Yu ....................... G02B 6/12004 |
| 2021/0159179 A1 | 5/2021 | Elsherbini et al. |
| 2021/0257335 A1 | 8/2021 | Shih |
| 2021/0305162 A1 | 9/2021 | Ganesan et al. |
| 2021/0375757 A1 | 12/2021 | Cho et al. |
| 2022/0344304 A1 | 10/2022 | Pan et al. |
| 2023/0136656 A1 | 5/2023 | Lai et al. |
| 2023/0378132 A1 | 11/2023 | Shen et al. |

OTHER PUBLICATIONS

U.S. Appl. No. 17/891,536, filed Aug. 19, 2022, Adel A. Elsherbini.
U.S. Appl. No. 17/891,560, filed Aug. 19, 2022, Adel A. Elsherbini.
U.S. Appl. No. 17/891,654, filed Aug. 19, 2022, Adel A. Elsherbini.
U.S. Appl. No. 17/891,666, filed Aug. 19, 2022, Adel A. Elsherbini.
U.S. Appl. No. 17/891,690, filed Aug. 19, 2022, Adel A. Elsherbini.
U.S. Appl. No. 17/891,704, filed Aug. 19, 2022, Adel A. Elsherbini.
U.S. Appl. No. 17/891,727, filed Aug. 19, 2022, Adel A. Elsherbini.
U.S. Appl. No. 17/891,735, filed Aug. 19, 2022, Adel A. Elsherbini.
U.S. Appl. No. 17/891,738, filed Aug. 19, 2022, Adel A. Elsherbini.
U.S. Appl. No. 17/891,880, filed Aug. 19, 2022, Adel A. Elsherbini.
Hsia, H et al "Heterogeneous Integration of a Compact Universal Photonic Engine for Silicon Photonics Applications in HPC", 2021 IEEE 71st Electronic Components and Technology Conference (ECTC), pp. 263-268 (6 pages).
U.S. Appl. No. 17/482,175, filed Sep. 22, 2021 and entitled "Photonic Integrated Circuit Packaging Architectures".

\* cited by examiner

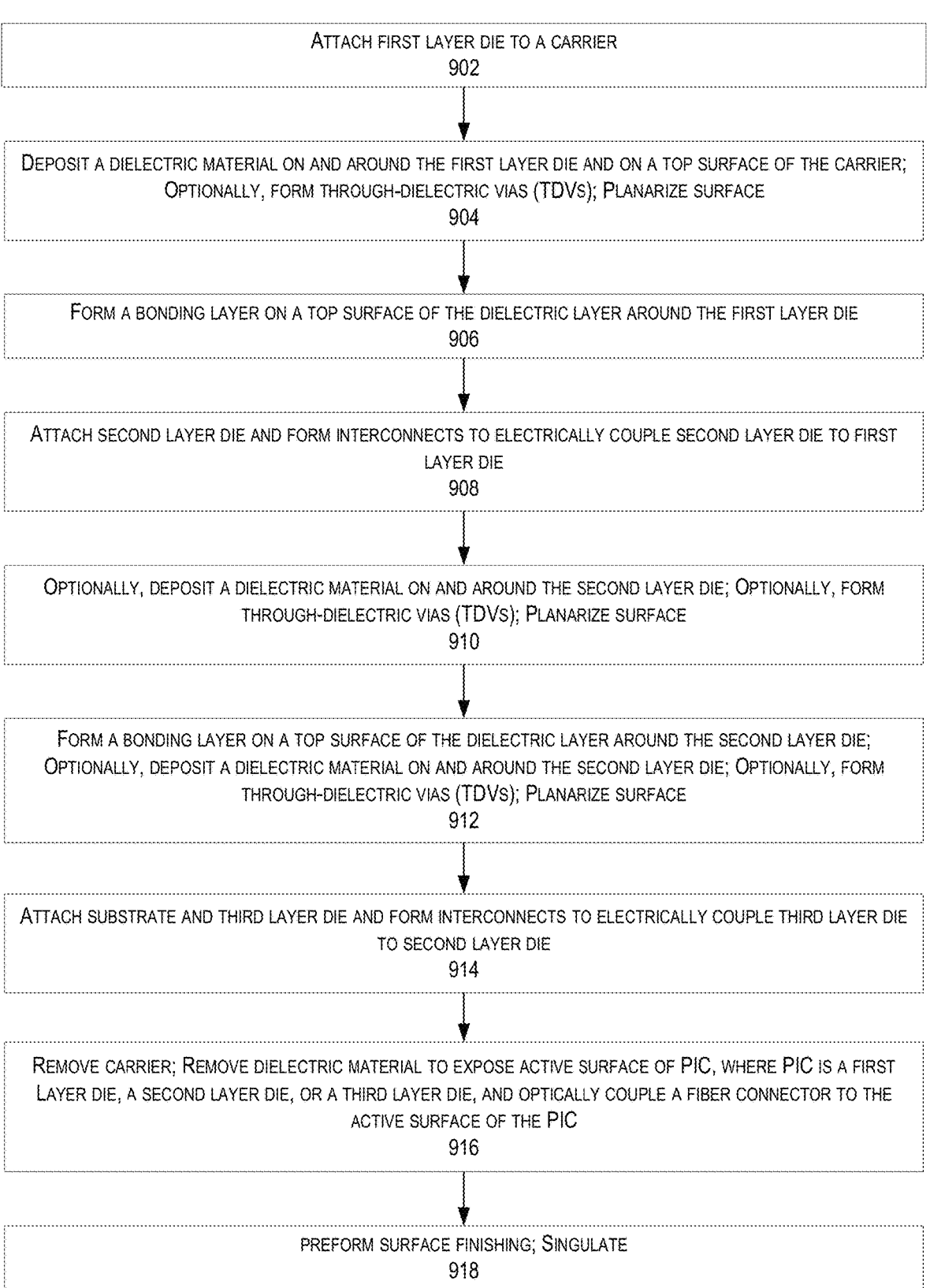

ATTACH FIRST LAYER DIE TO A CARRIER
902

DEPOSIT A DIELECTRIC MATERIAL ON AND AROUND THE FIRST LAYER DIE AND ON A TOP SURFACE OF THE CARRIER;
OPTIONALLY, FORM THROUGH-DIELECTRIC VIAS (TDVS); PLANARIZE SURFACE
904

FORM A BONDING LAYER ON A TOP SURFACE OF THE DIELECTRIC LAYER AROUND THE FIRST LAYER DIE
906

ATTACH SECOND LAYER DIE AND FORM INTERCONNECTS TO ELECTRICALLY COUPLE SECOND LAYER DIE TO FIRST
LAYER DIE
908

OPTIONALLY, DEPOSIT A DIELECTRIC MATERIAL ON AND AROUND THE SECOND LAYER DIE; OPTIONALLY, FORM
THROUGH-DIELECTRIC VIAS (TDVS); PLANARIZE SURFACE
910

FORM A BONDING LAYER ON A TOP SURFACE OF THE DIELECTRIC LAYER AROUND THE SECOND LAYER DIE;
OPTIONALLY, DEPOSIT A DIELECTRIC MATERIAL ON AND AROUND THE SECOND LAYER DIE; OPTIONALLY, FORM
THROUGH-DIELECTRIC VIAS (TDVS); PLANARIZE SURFACE
912

ATTACH SUBSTRATE AND THIRD LAYER DIE AND FORM INTERCONNECTS TO ELECTRICALLY COUPLE THIRD LAYER DIE
TO SECOND LAYER DIE
914

REMOVE CARRIER; REMOVE DIELECTRIC MATERIAL TO EXPOSE ACTIVE SURFACE OF PIC, WHERE PIC IS A FIRST
LAYER DIE, A SECOND LAYER DIE, OR A THIRD LAYER DIE, AND OPTICALLY COUPLE A FIBER CONNECTOR TO THE
ACTIVE SURFACE OF THE PIC
916

PREFORM SURFACE FINISHING; SINGULATE
918

FIG. 9

PHOTONIC QUASI-MONOLITHIC DIE ARCHITECTURES

TECHNICAL FIELD

The present disclosure relates to packaging photonic integrated circuits (PICs). More specifically, it relates to techniques, methods, and apparatus directed to quasi-monolithic die architectures including PICs.

BACKGROUND

Electronic circuits when commonly fabricated on a wafer of semiconductor material, such as silicon, are called integrated circuits (ICs). The wafer with such ICs is typically cut into numerous individual dies. The dies, including a PIC, may be packaged into an IC package containing one or more dies along with other electronic components such as resistors, capacitors, and inductors. The photonic IC package may be integrated onto an electronic system, such as a consumer electronic system.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 9 is a schematic flow diagram listing example operations that may be associated with fabricating a microelectronic assembly according to some embodiments of the present disclosure.

DETAILED DESCRIPTION

Figures 1A, 1B:
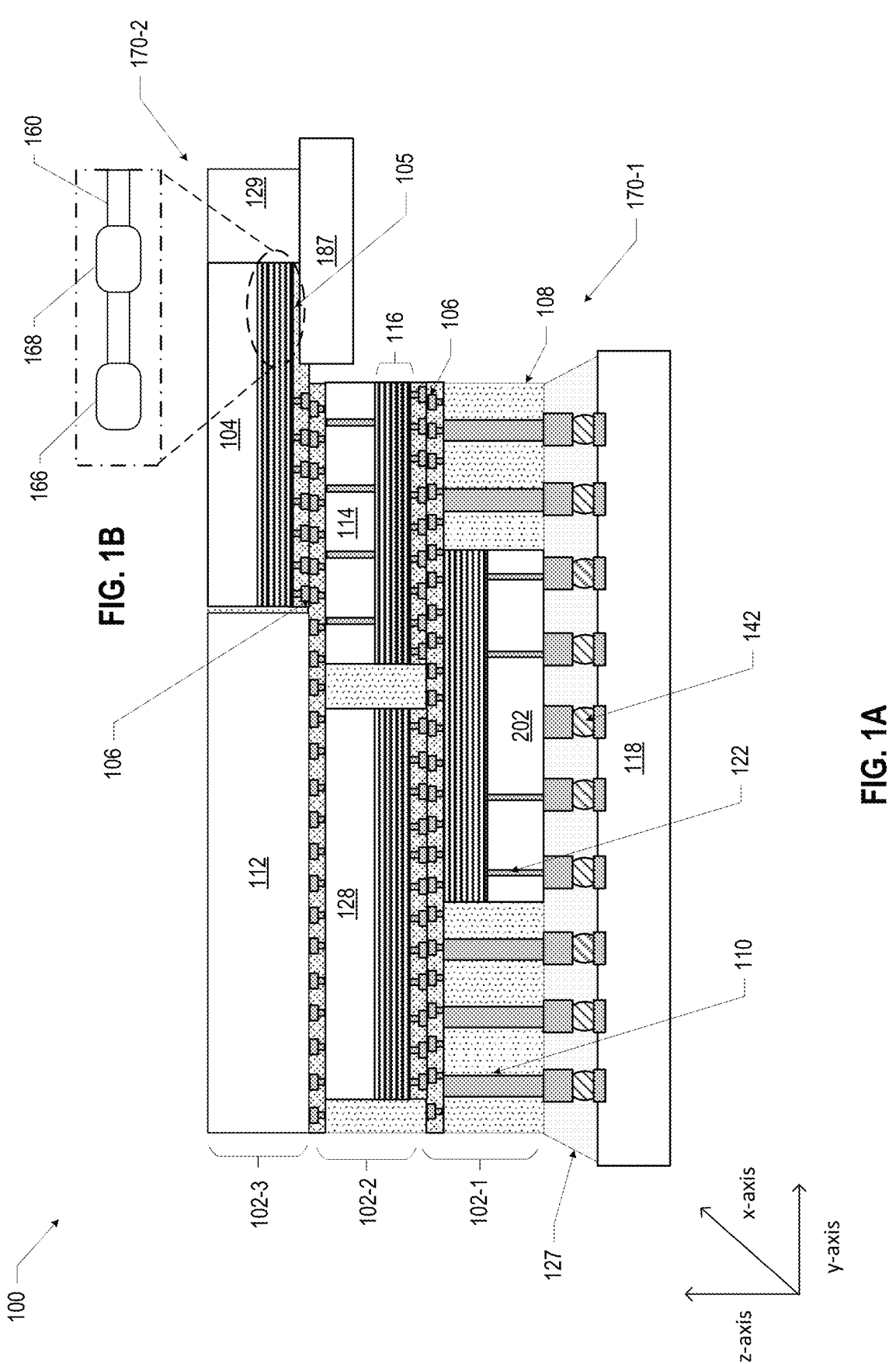
FIG. 1A is a schematic cross-sectional view of an example microelectronic assembly according to some embodiments of the present disclosure.
FIG. 1B is a schematic illustration of an example detail of an active surface of a photonic integrated circuit according to some embodiments of the present disclosure.

For purposes of illustrating photonic IC packages described herein, it is important to understand phenomena that may come into play during assembly and packaging of PICs. The following foundational information may be viewed as a basis from which the present disclosure may be properly explained. Such information is offered for purposes of explanation only and, accordingly, should not be construed in any way to limit the broad scope of the present disclosure and its potential applications.

Advances in semiconductor processing and logic design have permitted an increase in the amount of logic circuits that may be included in processors and other IC devices. As a result, many processors now have multiple cores that are monolithically integrated on a single die. Generally, these types of monolithic ICs are also described as planar since they take the form of a flat surface and are typically built on a single silicon wafer made from a monocrystalline silicon boule. The typical manufacturing process for such monolithic ICs is called a planar process, allowing photolithography, etching, heat diffusion, oxidation, and other such processes to occur on the surface of the wafer, such that active circuit elements (e.g., transistors and diodes) are formed on the planar surface of the silicon wafer.

Current technologies permit hundreds and thousands of such active circuit elements to be formed on a single die so that numerous logic circuits may be enabled thereon. In such monolithic dies, the manufacturing process must be optimized for all the circuits equally, resulting in trade-offs between different circuits. In addition, because of the limitation of having to place circuits on a planar surface, some circuits are farther apart from some others, resulting in decreased performance such as longer delays. The manufacturing yield may also be severely impacted because the entire die may have to be discarded if even one circuit is malfunctional.

One solution to overcome such negative impacts of monolithic dies is to disaggregate the circuits into smaller dies (e.g., chiplets, tiles) electrically coupled by interconnect bridges. The smaller dies are part of an assembly of interconnected dies that together form a complete IC in terms of application and/or functionality, such as a memory chip, microprocessor, microcontroller, commodity IC (e.g., chip used for repetitive processing routines, simple tasks, application specific IC, etc.), and system-on-a-chip (SoC). In other words, the individual dies are connected to create the functionalities of a monolithic IC. By using separate dies, each individual die can be designed and manufactured optimally for a particular functionality. For example, a processor core that contains logic circuits might aim for performance, and thus might require a very speed-optimized layout. This has different manufacturing requirements compared to a USB controller, which is built to meet certain universal serial bus (USB) standards, rather than for processing speed. Thus, by having different parts of the overall design separated into different dies, each one optimized in terms of design and manufacturing, the overall yield and cost of the combined die solution may be improved.

The connectivity between these dies is achievable by many ways. For example, in 2.5D packaging solutions, a silicon interposer and through-silicon vias (TSVs) connect dies at silicon interconnect speed in a minimal footprint. In another example, a silicon bridge embedded under the edges of two interconnecting dies facilitates electrical coupling between them. In a three-dimensional (3D) architecture, the dies are stacked one above the other, creating a smaller footprint overall. Typically, the electrical connectivity and mechanical coupling in such 3D architecture is achieved using TSVs and high pitch solder-based bumps (e.g., C2 interconnections). The bridge and the 3D stacked architecture may also be combined to allow for top-packaged chips to communicate with other chips horizontally using the bridge and vertically, using Through-Mold Vias (TMVs) which are typically larger than TSVs. However, these current interconnect technologies use solder or its equivalent for connectivity, with consequent low vertical and horizontal interconnect density.

One way to mitigate low vertical interconnect density is to use an interposer, which improves vertical interconnect density but suffers from low lateral interconnect density if the base wafer of the interposer is passive. In a general sense, an "interposer" is commonly used to refer to a base piece of silicon that interconnects two dies. By including active circuit elements in the interposer, lateral speeds may be improved, but it requires more expensive manufacturing processes, in particular when a large base die is used to interconnect smaller dies. Additionally, not all interfaces require fine pitch connections which may lead to additional manufacturing and processing overheads without the benefits of the fine pitch.

Integrating optical communications to IC packages further increases the complexity. Contemporary optical communications and other systems often employ PICs. Smaller, faster, and less expensive optical elements can enable universal, low-cost, high-volume optical communications needed for fast and efficient communication technologies demanded by high volume internet data traffic. In optical communications, information is transmitted by way of an optical carrier whose frequency typically is in the visible or near-infrared region of the electromagnetic spectrum. A carrier with such a high frequency is sometimes referred to as an optical signal, an optical carrier, a light wave signal, or simply light. A typical optical communications network includes several optical fibers, each of which may include several channels. A channel is a specified frequency band of an electromagnetic signal and is sometimes referred to as a wavelength. Technological advances today enable implementing portions of optical communication systems at the IC (or chip or die) level in PICs. Packaging such PICs presents many challenges.

In a general sense, a PIC integrates photonic functions for information signals imposed on electromagnetic waves, e.g., electromagnetic waves of optical wavelengths. PICs find application in fiber-optic communication, medical, security, sensing, and photonic computing systems. The PIC may implement one or more optical and electro-optical devices such as lasers, photodetectors, waveguides, and modulators on a single semiconductor chip. In addition, the PIC may also include electrical circuitry to process electrical signals corresponding to these optical signals. Such integrated PICs have both photonic processing and electrical signal processing in a same process node which may limit optimization. In other embodiments, PIC may be in a separate process node that optimizes PIC performance and electrical signal processing may be in a different process node that optimizes the electrical high-speed performance.

Packaging the PIC is not trivial. Among the challenges is a need for parallel tight-pitch interconnects that enable high density, high bandwidth electrical communication between the PIC and other electrical devices, such as processor integrated circuits (XPU), also referred to herein as "processor IC," and electronic integrated circuits (EIC) with simultaneous optical access to the PIC for the optical signals. Indeed, getting optical signals into and out of PICs is a driver of manufacturing cost and complexity. In addition, coupling a fiber-optic cable, also sometimes referred to as "optical fiber" or, simply, a "fiber," to a PIC so that electromagnetic signals, e.g., optical signals, may exchange between the two is challenging, One way to couple a PIC to a fiber is to implement edge-coupling by using an intermediate optical coupling structure (OCS) (sometimes referred to as "fiber connector," "fiber assembly unit" (FAU), or "fiber array block") that has one end coupled to a fiber and an opposite end placed proximate to a PIC die (i.e., a die that houses one or more PICs) so that electromagnetic signals may be exchanged between the PICs of the PIC die and the fiber, via the OCS. Because the signals require a transparent medium for propagation, the PIC are typically exposed in the package to allow the fiber to be coupled to the PIC with sufficient stability even in such edge-coupled assemblies.

In one aspect of the present disclosure, an example of photonic quasi-monolithic die architecture includes recursively coupling a plurality of IC dies to form microelectronic assemblies of a processing system. The plurality of IC dies may comprise active dies and/or passive dies and at least a portion of the plurality of dies are coupled using high-density interconnects. As used herein, "high-density interconnects" include die-to-die (DTD) interconnects having a pitch of less than 10 microns. As used herein, pitch is measured center-to-center (e.g., from a center of an interconnect to a center of an adjacent interconnect).

Accordingly, microelectronic assemblies, related devices and methods, are disclosed herein. In some embodiments, a microelectronic assembly may include a bridge die in a first layer surrounded by a dielectric material; a processor integrated circuit (processor IC) and an integrated circuit (IC) in a second layer, the second layer on the first layer, wherein the bridge die is electrically coupled to the processor IC and the IC by first interconnects having a pitch of less than 10 microns between adjacent first interconnects; a photonic integrated circuit (PIC) and a substrate in a third layer, the third layer on the second layer, wherein the PIC has an active surface, and wherein the active surface of the PIC is coupled to the IC by second interconnects having a pitch of less than 10 microns between adjacent second interconnects; and a fiber connector optically coupled to the active surface of the PIC. The terms "bridge die," "bridge," "interconnect bridge," and "interconnect die" may be used interchangeably herein.

Each of the structures, assemblies, packages, methods, devices, and systems of the present disclosure may have several innovative aspects, no single one of which is solely responsible for all the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art.

The terms "circuit" and "circuitry" mean one or more passive and/or active electrical and/or electronic components that are arranged to cooperate with one another to provide a desired function. The terms also refer to analog circuitry, digital circuitry, hard wired circuitry, programmable circuitry, microcontroller circuitry and/or any other type of physical hardware electrical and/or electronic component.

The term "integrated circuit" means a circuit that is integrated into a monolithic semiconductor or analogous material.

As used herein, the term "optical element" includes arrangements of forms fabricated in ICs to receive, transform and/or transmit optical signals as described herein. It may include optical conductors such as waveguides, grating coupler, electromagnetic radiation sources such as lasers, and electro-optical devices such as photodetectors.

In some embodiments, the IC dies disclosed herein may comprise substantially monocrystalline semiconductors, such as silicon or germanium, as a base material (e.g., substrate, body) on which integrated circuits are fabricated with traditional semiconductor processing methods. The semiconductor base material may include, for example, N-type pr P-type materials. Dies may include, for example, a crystalline base material formed using a bulk silicon (or other bulk semiconductor material) or a silicon-on-insulator (SOI) structure. In some other embodiments, the base material of one or more of the IC dies may comprise alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-N, group III-V, group II-VI, or group IV materials. In yet other embodiments, the base material may comprise compound semiconductors, for example, with a first sub-lattice of at least one element from group III of the periodic table (e.g., Al, Ga, In), and a second sub-lattice of at least one element of group V of the periodic table (e.g., P, As, Sb). In yet other embodiments, the base material may comprise an intrinsic IV or III-V semiconductor material or alloy, not intentionally doped with any electrically active impurity; in alternate embodiments, nominal impurity dopant levels may be present. In still other embodiments, dies may comprise a noncrystalline material, such as polymers; for example, the base material may comprise silica-filled epoxy. In other embodiments, the base material may comprise high mobility oxide semiconductor material, such as tin oxide, antimony oxide, indium oxide, indium tin oxide, titanium oxide, zinc oxide, indium zinc oxide, indium gallium zinc oxide (IGZO), gallium oxide, titanium oxynitride, ruthenium oxide, or tungsten oxide. In general, the base material may include one or more of tin oxide, cobalt oxide, copper oxide, antimony oxide, ruthenium oxide, tungsten oxide, zinc oxide, gallium oxide, titanium oxide, indium oxide, titanium oxynitride, indium tin oxide, indium zinc oxide, nickel oxide, niobium oxide, copper peroxide, IGZO, indium telluride, molybdenite, molybdenum diselenide, tungsten diselenide, tungsten disulfide, N- or P-type amorphous or polycrystalline silicon, germanium, indium gallium arsenide, silicon germanium, gallium nitride, aluminum gallium nitride, indium phosphide, and black phosphorus, each of which may possibly be doped with one or more of gallium, indium, aluminum, fluorine, boron, phosphorus, arsenic, nitrogen, tantalum, tungsten, and magnesium, etc. Although a few examples of the material for dies are described here, any material or structure that may serve as a foundation (e.g., base material) upon which IC circuits and structures as described herein may be built falls within the spirit and scope of the present disclosure.

Unless described otherwise, IC dies described herein include one or more IC structures (or, simply, "ICs") implementing (i.e., configured to perform) certain functionality. In one such example, the term "memory die" may be used to describe a die that includes one or more ICs implementing memory circuitry (e.g., ICs implementing one or more of memory devices, memory arrays, control logic configured to control the memory devices and arrays, etc.). In another such example, the term "compute die" may be used to describe a die that includes one or more ICs implementing logic/compute circuitry (e.g., ICs implementing one or more of I/O functions, arithmetic operations, pipelining of data, etc.).

In another example, the terms "package" and "IC package" are synonymous, as are the terms "die" and "IC die." Note that the terms "chip," "chiplet," "die," and "IC die" are used interchangeably herein.

The term "insulating" means "electrically insulating," the term "conducting" means "electrically conducting," unless otherwise specified. With reference to optical signals and/or devices, components and elements that operate on or using optical signals, the term "conducting" can also mean "optically conducting."

The terms "oxide," "carbide," "nitride," etc. refer to compounds containing, respectively, oxygen, carbon, nitrogen, etc.

The term "high-k dielectric" refers to a material having a higher dielectric constant than silicon oxide, while the term "low-k dielectric" refers to a material having a lower dielectric constant than silicon oxide.

The term "insulating material" or "insulator" (also called herein as "dielectric material" or "dielectric") refers to solid materials (and/or liquid materials that solidify after processing as described herein) that are substantially electrically nonconducting. They may include, as examples and not as limitations, organic polymers and plastics, and inorganic materials such as ionic crystals, porcelain, glass, silicon, silicon oxide, silicon carbide, silicon carbonitride, silicon nitride, and alumina or a combination thereof. They may include dielectric materials, high polarizability materials, and/or piezoelectric materials. A dielectric material may include any suitable dielectric material commonly used in semiconductor manufacture, such as silicon and one or more of oxygen, nitrogen, hydrogen, and carbon (e.g., in the form of silicon oxide, silicon nitride, silicon oxynitride, or silicon carbon nitride); a polyimide material; or a low-k or ultra low-k dielectric (e.g., carbon-doped dielectrics, fluorine-doped dielectrics, porous dielectrics, organic polymeric dielectrics, photo-imageable dielectrics, and/or benzocyclobutene-based polymers). They may be transparent or opaque without departing from the scope of the present disclosure. Further examples of insulating materials are underfills and molds or mold-like materials used in packaging applications, including for example, materials used in organic interposers, package supports and other such components.

In various embodiments, elements associated with an IC may include, for example, transistors, diodes, power sources, resistors, capacitors, inductors, sensors, transceivers, receivers, antennas, etc. In various embodiments, elements associated with an IC may include those that are monolithically integrated within an IC, mounted on an IC, or those connected to an IC. The ICs described herein may be either analog or digital and may be used in a number of applications, such as microprocessors, optoelectronics, logic blocks, audio amplifiers, etc., depending on the components associated with the IC. The ICs described herein may be employed in a single IC die or as part of a chipset for executing one or more related functions in a computer.

In various embodiments of the present disclosure, transistors described herein may be field-effect transistors (FETs), e.g., MOSFETs. In many embodiments, an FET is a four-terminal device. In silicon-on-insulator, or nanoribbon, or gate all-around (GAA) FET, the FET is a three-terminal device that includes source, drain, and gate terminals and uses electric field to control current flowing through the device. A FET typically includes a channel material, a source region and a drain regions provided in and/or over the channel material, and a gate stack that includes a gate electrode material, alternatively referred to as a "work function" material, provided over a portion of the channel material (the "channel portion") between the source and the drain regions, and optionally, also includes a gate dielectric material between the gate electrode material and the channel material.

In a general sense, an "interconnect" refers to any element that provides a physical connection between two other elements. For example, an electrical interconnect provides electrical connectivity between two electrical components, facilitating communication of electrical signals between them; an optical interconnect provides optical connectivity between two optical components, facilitating communication of optical signals between them. As used herein, both electrical interconnects and optical interconnects are comprised in the term "interconnect." The nature of the interconnect being described is to be understood herein with reference to the signal medium associated therewith. Thus, when used with reference to an electronic device, such as an IC that operates using electrical signals, the term "interconnect" describes any element formed of an electrically conductive material for providing electrical connectivity to one or more elements associated with the IC or/and between various such elements. In such cases, the term "interconnect" may refer to both conductive traces (also sometimes referred to as "lines," "wires," "metal lines" or "trenches") and conductive vias (also sometimes referred to as "vias" or "metal vias"). Sometimes, electrically conductive traces and vias may be referred to as "conductive traces" and "conductive vias", respectively, to highlight the fact that these elements include electrically conductive materials such as metals. Likewise, when used with reference to a device that operates on optical signals as well, such as a PIC, "interconnect" may also describe any element formed of a material that is optically conductive for providing optical connectivity to one or more elements associated with the PIC. In such cases, the term "interconnect" may refer to optical waveguides, including optical fiber, optical splitters, optical combiners, optical couplers, and optical vias.

The term "waveguide" refers to any structure that acts to guide the propagation of light from one location to another location typically through a substrate material such as silicon or glass. In various examples, waveguides can be formed from silicon, doped silicon, silicon nitride, glasses such as silica (e.g., silicon dioxide or $SiO_2$), borosilicate (e.g., 70-80 wt % $SiO_2$, 7-13 wt % of $B_2O_3$, 4-8 wt % $Na_2O$ or $K_2O$, and 2-8 wt % of $Al_2O_3$) and so forth. Waveguides may be formed using various techniques including but not limited to forming waveguides in situ. For example, in some embodiments, waveguides may be formed in situ in glass using low temperature glass-to-glass bonding or by laser direct writing. Waveguides formed in situ may have lower loss characteristics.

The term "conductive trace" may be used to describe an electrically conductive element isolated by an insulating material. Within IC dies, such insulating material comprises interlayer low-k dielectric that is provided within the IC die. Within package substrates, and printed circuit boards (PCBs) such insulating material comprises organic materials such as Ajinomoto Buildup Film (ABF), polyimides, or epoxy resin. Such conductive lines are typically arranged in several levels, or several layers, of metallization stacks.

The term "conductive via" may be used to describe an electrically conductive element that interconnects two or more conductive lines of different levels of a metallization stack. To that end, a via may be provided substantially perpendicularly to the plane of an IC die/chip or a support structure over which an IC structure is provided and may interconnect two conductive lines in adjacent levels or two conductive lines in non-adjacent levels.

The term "package substrate" may be used to describe any substrate material that facilitates the packaging together of any collection of semiconductor dies and/or other electrical components such as passive electrical components. As used herein, a package substrate may be formed of any material including, but not limited to, insulating materials such as resin impregnated glass fibers (e.g., PCB or Printed Wiring Boards (PWB)), glass, ceramic, silicon, silicon carbide, etc. In addition, as used herein, a package substrate may refer to a substrate that includes buildup layers (e.g., ABF layers).

The term "metallization stack" may be used to refer to a stack of one or more interconnects for providing connectivity to different circuit components of an IC die/chip and/or a package substrate.

As used herein, the term "pitch" of interconnects refers to a center-to-center distance between adjacent interconnects.

In context of a stack of dies coupled to one another or in context of a die coupled to a package substrate, the term "interconnect" may also refer to, respectively, die-to-die (DTD) interconnects and die-to-package substrate (DTPS) interconnects. DTD interconnects may also be referred to as first-level interconnects (FLI). DTPS interconnects may also be referred to as Second-Level Interconnects (SLI).

Although not specifically shown in all of the present illustrations in order to not clutter the drawings, when DTD or DTPS interconnects are described, a surface of a first die may include a first set of conductive contacts, and a surface of a second die or a package substrate may include a second set of conductive contacts. One or more conductive contacts of the first set may then be electrically and mechanically coupled to some of the conductive contacts of the second set by the DTD or DTPS interconnects.

In some embodiments, the pitch of the DTD interconnects may be different from the pitch of the DTPS interconnects, although, in other embodiments, these pitches may be substantially the same.

The DTPS interconnects disclosed herein may take any suitable form. In some embodiments, a set of DTPS interconnects may include solder (e.g., solder bumps or balls that are subject to a thermal reflow to form the DTPS interconnects). DTPS interconnects that include solder may include any appropriate solder material, such as lead/tin, tin/bismuth, eutectic tin/silver, ternary tin/silver/copper, eutectic tin/copper, tin/nickel/copper, tin/bismuth/copper, tin/indium/copper, tin/zinc/indium/bismuth, or other alloys. In some embodiments, a set of DTPS interconnects may include an anisotropic conductive material, such as an anisotropic conductive film or an anisotropic conductive paste. An anisotropic conductive material may include conductive materials dispersed in a non-conductive material. In some embodiments, an anisotropic conductive material may include microscopic conductive particles embedded in a binder or a thermoset adhesive film (e.g., a thermoset biphenyl-type epoxy resin, or an acrylic-based material). In some embodiments, the conductive particles may include a polymer and/or one or more metals (e.g., nickel or gold). For example, the conductive particles may include nickel-coated gold or silver-coated copper that is in turn coated with a polymer. In another example, the conductive particles may include nickel. When an anisotropic conductive material is uncompressed, there may be no conductive pathway from one side of the material to the other. However, when the anisotropic conductive material is adequately compressed (e.g., by conductive contacts on either side of the anisotropic conductive material), the conductive materials near the region of compression may contact each other so as to form a conductive pathway from one side of the film to the other in the region of compression.

The DTD interconnects disclosed herein may take any suitable form. In some embodiments, some or all of the DTD interconnects in a microelectronic assembly or an IC package as described herein may be metal-to-metal interconnects (e.g., copper-to-copper interconnects, or plated interconnects). In such embodiments, the conductive contacts on either side of the DTD interconnect may be bonded together (e.g., under elevated pressure and/or temperature) without the use of intervening solder or an anisotropic conductive material. In some metal-to-metal interconnects, a dielectric material (e.g., silicon oxide, silicon nitride, silicon carbide) may be present between the metals bonded together (e.g., between copper pads or posts that provide the associated conductive contacts). In some embodiments, one side of a DTD interconnect may include a metal pillar (e.g., a copper pillar), and the other side of the DTD interconnect may include a metal contact (e.g., a copper contact) recessed in a dielectric. In some embodiments, a metal-to-metal interconnect (e.g., a copper-to-copper interconnect) may include a noble metal (e.g., gold) or a metal whose oxides are conductive (e.g., silver). In some embodiments, a metal-to-metal interconnect may include metal nanostructures (e.g., nanorods) that may have a reduced melting point. Metal-to-metal interconnects may be capable of reliably conducting a higher current than other types of interconnects; for example, some solder interconnects may form brittle intermetallic compounds when current flows, and the maximum current provided through such interconnects may be constrained to mitigate mechanical failure.

In some embodiments, the dies on either side of a set of DTD interconnects may be bare (e.g., unpackaged) dies.

In some embodiments, the DTD interconnects may include solder. For example, the DTD interconnects may include conductive bumps or pillars (e.g., copper bumps or pillars) attached to the respective conductive contacts by solder. In some embodiments, a thin cap of solder may be used in a metal-to-metal interconnect to accommodate planarity, and this solder may become an intermetallic compound during processing. In some embodiments, the solder used in some or all of the DTD interconnects may have a higher melting point than the solder included in some or all of the DTPS interconnects. For example, when the DTD interconnects in an IC package are formed before the DTPS interconnects are formed, solder-based DTD interconnects may use a higher-temperature solder (e.g., with a melting point above 200 degrees Celsius), while the DTPS interconnects may use a lower-temperature solder (e.g., with a melting point below 200 degrees Celsius). In some embodiments, a higher-temperature solder may include tin; tin and gold; or tin, silver, and copper (e.g., 96.5% tin, 3% silver, and 0.5% copper). In some embodiments, a lower-temperature solder may include tin and bismuth (e.g., eutectic tin bismuth), tin, silver, bismuth, indium, indium and tin, or gallium.

In some embodiments, a set of DTD interconnects may include an anisotropic conductive material, such as any of the materials discussed above for the DTPS interconnects. In some embodiments, the DTD interconnects may be used as data transfer lanes, while the DTPS interconnects may be used for power and ground lines, among others.

In microelectronic assemblies or IC packages as described herein, some or all of the DTD interconnects may have a finer pitch than the DTPS interconnects. In some embodiments, the DTPS interconnects disclosed herein may have a pitch between about 80 microns and 300 microns, while the DTD interconnects disclosed herein may have a pitch between about 0.5 microns and 100 microns, depending on the type of the DTD interconnects. An example of silicon-level interconnect density is provided by the density of some DTD interconnects. In some embodiments, the DTD interconnects may have too fine a pitch to couple to the package substrate directly (e.g., too fine to serve as DTPS interconnects). The DTD interconnects may have a smaller pitch than the DTPS interconnects due to the greater similarity of materials in the different dies on either side of a set of DTD interconnects than between a die and a package substrate on either side of a set of DTPS interconnects. In particular, the differences in the material composition of dies and package substrates may result in differential expansion and contraction of the die dies and package substrates due to heat generated during operation (as well as the heat applied during various manufacturing operations). To mitigate damage caused by this differential expansion and contraction (e.g., cracking, solder bridging, etc.), the DTPS interconnects in any of the microelectronic assemblies or IC packages as described herein may be formed larger and farther apart than DTD interconnects, which may experience less thermal stress due to the greater material similarity of the pair of dies on either side of the DTD interconnects.

It will be recognized that one more levels of underfill (e.g., organic polymer material such as benzotriazole, imidazole, polyimide, or epoxy) may be provided in an IC package described herein and may not be labeled in order to avoid cluttering the drawings. In various embodiments, the levels of underfill may comprise the same or different insulating materials. In some embodiments, the levels of underfill may comprise thermoset epoxies with silicon oxide particles; in some embodiments, the levels of underfill may comprise any suitable material that can perform underfill functions such as supporting the dies and reducing thermal stress on interconnects. In some embodiments, the choice of underfill material may be based on design considerations, such as form factor, size, stress, operating conditions, etc.; in other embodiments, the choice of underfill material may be based on material properties and processing conditions, such as cure temperature, glass transition temperature, viscosity and chemical resistance, among other factors; in some embodiments, the choice of underfill material may be based on both design and processing considerations.

In some embodiments, one or more levels of solder resist (e.g., epoxy liquid, liquid photoimageable polymers, dry film photoimageable polymers, acrylics, solvents) may be provided in an IC package described herein and may not be labeled or shown to avoid cluttering the drawings. Solder resist may be a liquid or dry film material including photo-imageable polymers. In some embodiments, solder resist may be non-photoimageable.

The terms "substantially," "close," "approximately," "near," and "about," generally refer to being within +/−20% of a target value (e.g., within +/−5% or 10% of a target value) based on the context of a particular value as described herein or as known in the art.

Terms indicating orientation of various elements, e.g., "coplanar," "perpendicular," "orthogonal," "parallel," or any other angle between the elements, generally refer to being within +/−5%-20% of a target value based on the context of a particular value as described herein or as known in the art.

The term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices.

The description uses the phrases "in an embodiment" or "in embodiments," which may each refer to one or more of the same or different embodiments.

Furthermore, the terms "comprising," "including," "having," and the like, as used with respect to embodiments of the present disclosure, are synonymous.

The disclosure may use perspective-based descriptions such as "above," "below," "top," "bottom," and "side"; such descriptions are used to facilitate the discussion and are not intended to restrict the application of disclosed embodiments.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

The term "dispose" as used herein refers to position, location, placement, and/or arrangement rather than to any particular method of formation.

The term "between," when used with reference to measurement ranges, is inclusive of the ends of the measurement ranges.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). When used herein, the notation "A/B/C" means (A), (B), and/or (C).

Although certain elements may be referred to in the singular herein, such elements may include multiple sub-elements. For example, "an electrically conductive material"

may include one or more electrically conductive materials. In another example, "a dielectric material" may include one or more dielectric materials.

Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale.

In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profi-lometer. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

Note that in the figures, various components (e.g., interconnects) are shown as aligned (e.g., at respective interfaces) merely for ease of illustration; in actuality, some or all of them may be misaligned. In addition, there may be other components, such as bond-pads, landing pads, metallization, etc. present in the assembly that are not shown in the figures to prevent cluttering. Further, the figures are intended to show relative arrangements of the components within their assemblies, and, in general, such assemblies may include other components that are not illustrated (e.g., various interfacial layers or various other components related to optical functionality, electrical connectivity, or thermal mitigation). For example, in some further embodiments, the assembly as shown in the figures may include more dies along with other electrical components. Additionally, although some components of the assemblies are illustrated in the figures as being planar rectangles or formed of rectangular solids, this is simply for ease of illustration, and embodiments of these assemblies may be curved, rounded, or otherwise irregularly shaped as dictated by and sometimes inevitable due to the manufacturing processes used to fabricate various components.

In the drawings, a particular number and arrangement of structures and components are presented for illustrative purposes and any desired number or arrangement of such structures and components may be present in various embodiments.

Further, unless otherwise specified, the structures shown in the figures may take any suitable form or shape according to material properties, fabrication processes, and operating conditions.

Figure 1C:
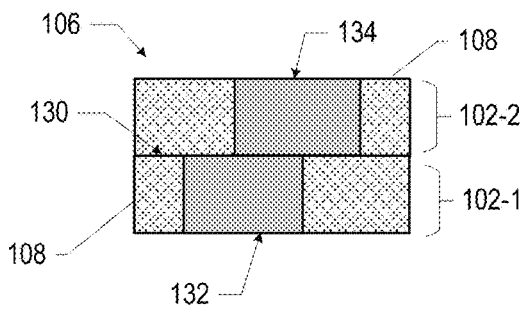
FIG. 1C is a schematic cross-sectional view of a portion of the example microelectronic assembly of FIG. 1A.
Figure 1D:
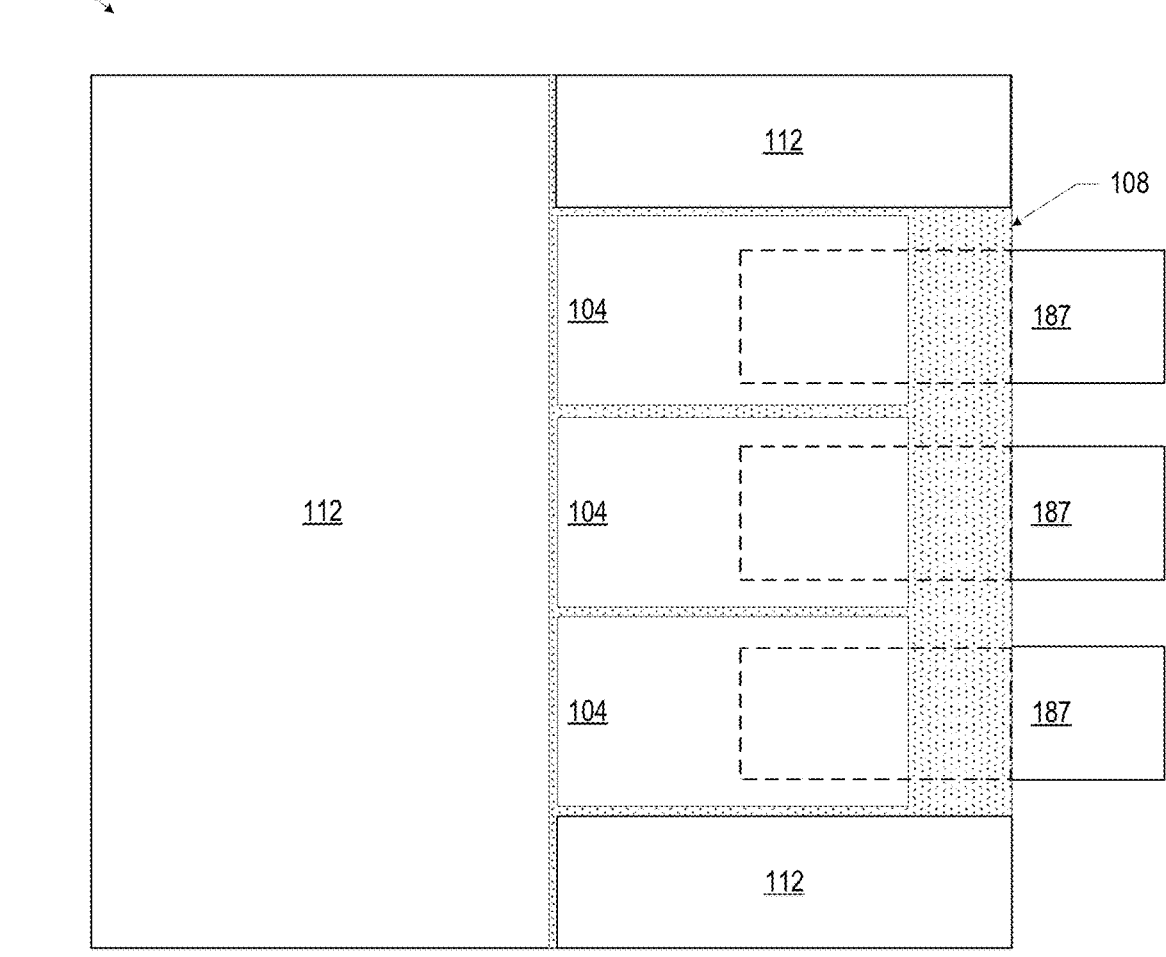
FIG. 1D is top view of the example microelectronic assembly of FIG. 1A.

For convenience, if a collection of drawings designated with different letters are present (e.g., FIGS. 1A-1D), such a collection may be referred to herein without the letters (e.g., as "FIG. 1"). Similarly, if a collection of reference numerals designated with different numerals or letters are present (e.g., 102-1, 102-2, 102-3), such a collection may be referred to herein without the numerals or letters (e.g., as "102").

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

FIG. 1A is a schematic cross-sectional view of an example microelectronic assembly 100 according to some embodiments of the present disclosure. Microelectronic assembly 100 comprises a plurality of layers 102 (e.g., 102-1, 102-2, and 102-3) of IC dies (e.g., PIC 104, XPU 128, EIC 114, bridge die 202), each layer 102 coupled to adjacent layers 102 by interconnects 106. In various embodiments, interconnects 106 may be FLI with a pitch of less than 10 micrometers between adjacent interconnects. An example of interconnect 106 in some embodiments is a hybrid bond, comprising metal-metal and dielectric-dielectric bonds. The plurality of layers 102 may be electrically coupled to a package substrate 118. As used herein, the terms "photonic package," "photonic microelectronic assembly," "microelectronic assembly," and similar variations may be used interchangeably.

In the example shown in the figure, the number of layers 102 is three: a first layer 102-1, a second layer 102-2, and a third layer 102-3. In various other embodiments, microelectronic assembly 100 may include two or greater number of layers 102. As shown in FIG. 1A, the microelectronic assembly 100 may include a first layer 102-1 having a bridge die 202 and one or more through-dielectric vias (TDVs) 110, a second layer 104-2 having an XPU 128 and an EIC 114, and a third layer 102-3 having a substrate 112, a PIC 104, and a support material 129 coupled to a lateral surface of PIC 104 and a top surface of a fiber connector 187. In some embodiments (as shown), one or more IC dies (e.g., EIC 114, bridge die 202) in some layers 102 (e.g., 102-1, 102-2), may include TSVs 122. TSVs 122 may be configured to carry power, signals and/or ground connection between package substrate 118 and IC dies (e.g., PIC 104, XPU 128, EIC 114, bridge die 202) in the plurality of layers 102. The plurality of layers 102 may include a first surface 170-1 (e.g., a bottom surface) and an opposing second surface 170-2 (e.g., a top surface).

In various embodiments, one or more of the plurality of layers 102 may include a dielectric material 108 around (e.g., between, surrounding, etc.) IC dies (e.g., PIC 104, XPU 128, EIC 114, bridge die 202). One or more through-dielectric vias (TDVs) 110 may be present in dielectric material 108 in layers 102. In various embodiments, dielectric material 108 comprises inorganic materials, for example, silicon and one or more of oxygen, nitrogen, and carbon (e.g., in the form of silicon oxide, silicon nitride, or silicon carbide), and/or other forms of inorganic dielectric material typically used as interlayer dielectric (ILD) in semiconductor devices.

In various embodiments, one or more IC die (e.g., PIC 104, XPU 128, EIC 114, bridge die 202) in microelectronic assembly 100 may include different kinds of conductive traces, such as conductive traces configured to carry power and conductive traces configured to carry signals, having different dimensions (e.g., conductive traces configured to carry power may, in general, be larger (e.g., thicker, wider) than conductive traces configured to carry signals). Conductive traces may be present in a metallization stack 116 having a plurality of metal layers through insulator fabricated using known semiconductor manufacturing processes. In some embodiments, the insulator material in the metallization stacks may be the same as that of the dielectric material 108 around IC dies (e.g., PIC 104, XPU 128, EIC 114, bridge die 202); in other embodiments, the insulator material in the metallization stacks may be different from that of dielectric material 108 around IC dies (e.g., PIC 104, XPU 128, EIC 114, bridge die 202).

In the example embodiment shown in the figure, some metallization stacks 116 of the IC die are face-to-face (e.g., metallization stack 116 of bridge die 202 faces and is coupled to the metallization stacks 116 of XPU 128 and EIC 114, and some metallization stacks 116 of the IC dies are face-to-back (e.g., metallization stack 116 of EIC 114 faces away from metallization stack 116 of PIC 104, such that the PIC 104 is coupled to the TSVs 122 of the EIC 114). Although FIG. 1A shows a particular number and arrangement of IC dies, a microelectronic assembly may have any suitable number and arrangement of IC dies. In some embodiments, each layer 102 may comprise an interface or bonding layer comprising the metal material and dielectric material of interconnects 106. Interconnects 106 may further provide electrical coupling between EIC 114 and an XPU 128 via bridge die 202. Interconnects 106 may enable electrical coupling between PIC 104, EIC 114, bridge die 202, and XPU 128.

A fiber connector 187 may be optically coupled to the active surface 105 of the PIC 104 (e.g., at an overhang portion of PIC 104). The overhang portion of PIC 104 may be formed by removing (e.g., using an etching process) portions of the dielectric material 108 from layers 102-1 and 102-2, as described below with reference to FIG. 7. The fiber connector 187 may be further coupled to a support material 129 to increase attachment of the fiber connector 187 to PIC 104. A support material 129 may include any suitable material that may provide mechanical support and structural stability to the fiber connector 187, for example, silicon dioxide, glass, epoxy and/or resins. In some embodiments, the support material 129 may be omitted. The active surface 105 of the PIC 104 may include optical elements. Example optical elements over a portion of active surface 105 are shown in more detail in FIG. 18. FIG. 18 is a schematic of a face of active surface 105 (e.g., looking down at the active surface 105 of the PIC 104). Example optical elements include an electromagnetic radiation source 166, an electro-optical device 168, and a waveguide 160. In many embodiments, the optical elements may be fabricated on active surface 105 using any known method in the art, including semiconductor photolithographic and deposition methods. In some embodiments, the optical elements may extend substantially across an entire area of active surface 105. In some embodiments, the optical elements may be confined within a portion of active surface 105. In some embodiments, a PIC 104 may be configured to transmit and/or receive an optical signal at an active surface 105 (e.g., as depicted in FIG. 1A). In some embodiments, a PIC 104 may be configured to transmit and/or receive an optical signal at a lateral surface (not shown).

Electromagnetic radiation source 166 can enable generating optical signals and may include lasers, for example if PIC 104 supports wavelengths between about 0.8 and 1.7 micrometer. Electro-optical device 168 can enable receiving, transforming, and transmitting optical signals. In some embodiments, electro-optical device 168 may be any device or component configured to encode information in/onto the electromagnetic signals, such as modulator, polarizer, phase shifter, and photodetector.

Waveguide 160 can guide optical signals and also perform coupling, switching, splitting, multiplexing and demultiplexing optical signals. In some embodiments, waveguide 160 may include any component configured to feed, or launch, the electromagnetic signal into the medium of propagation such as an optical fiber. In some embodiments, waveguide 160 may further be configured as optical multiplexers and/or demultiplexers, for example, to perform wavelength division multiplexing (WDM). In some embodiments, waveguide 160 may include a de-multiplexer, such as Arrayed Waveguide Grating (AWG) de-multiplexer, an Echelle grating, a single-mode waveguide, or a thin film filter (TFF) de-multiplexer. Waveguide 160 may comprise planar and non-planar waveguides of any type. In one example, waveguide 160 may comprise a silicon photonic waveguide based on silicon-on-isolator (SOI) platform, configured to guide electromagnetic radiation of any wavelength bands from about 0.8 micrometer to about 5.0 micrometer. In another example, waveguide 160 may support wavelengths from about 1.2 micrometer to about 1.7 micrometer in the near infrared and infrared bands for use in data communications and telecommunications.

Although only three such example optical elements are illustrated in FIG. 1B, it may be understood that PIC 104 may include more optical elements of the same or different types that enable it to function appropriately as a photonic device receiving, transforming, and transmitting optical and electrical signals.

In some embodiments, the optical elements on active surface 105 may be covered with a protective layer (not shown) of suitable material, such as alumina, optical epoxy, or silicon oxide. The protective layer enables maintaining integrity of the optical elements during fabrication processes to which PIC 104 may be subjected, for example, attaching, solder reflowing, grinding, polishing, underfilling, and molding. The protective layer may ensure, for example, that optical transmission properties of the optical elements are not compromised during the fabrication processes by contamination with mold or underfill material, or that optical functionality is not compromised by tearing, breaking, or other destructive events during the fabrication processes. The protective layer may also serve to avoid leaking optical signals from the optical elements, including waveguide 160, during operation of PIC 104. For example, the protective layer may further serve to provide oxide-to-oxide bonding between the optical elements of PIC 104 and the fiber connector 187 when a silicon oxide material is used. In another example, the protective layer may serve to provide nitride-to-nitride bonding between the optical elements of PIC 104 and the fiber connector 187 when a silicon nitride material is used. The silicon oxide layers in oxide-to-oxide bonding, or the silicon nitride layers in nitride-to-nitride bonding, may be bonded initially by Van-der-Waals forces and subsequently by high temperature fusion bonding. The oxide-to-oxide bonding and nitride-to-nitride bonding may decrease optical signal losses.

In general, the light provided to PIC 104 may include any electromagnetic signals having information encoded therein (or, phrased differently, any electromagnetic signals modulated to include information). Often times, the electromagnetic signals are signals associated with optical amplitudes, phases, and wavelengths and, therefore, descriptions provided herein refer to "optical" signals (or light) and "optical" components (e.g., "electro-optical device 168"). However, photonic microelectronic assembly 100 with PIC 104, as described herein, are not limited to operating with electromagnetic signals of optical spectrum and descriptions provided herein with reference to optical signals and/or optical elements are equally applicable to electromagnetic signals of any suitable wavelength, such as electromagnetic signals in near-infrared (NIR) and/or infrared (IR) bands, as well as electromagnetic signals in the RF and/or microwave bands.

PIC 104 may comprise a semiconductor material including, for example, N-type or P-type materials. PIC 104 may include, for example, a crystalline substrate formed using a bulk silicon (or other bulk semiconductor material) or a SOI structure (or, in general, a semiconductor-on-insulator structure). In some embodiments, PIC 104 may be formed using alternative materials, which may or may not be combined with silicon, that include, but are not limited to, lithium niobite, indium phosphide, silicon dioxide, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-N or group IV materials. In some embodiments, PIC 104 may comprise a non-crystalline material, such as polymers. In some embodiments, PIC 104 may be formed on a printed circuit board (PCB). In some embodiments, PIC 104 may be inhomogeneous, including a carrier material (such as glass or silicon carbide) as a substrate with a thin semiconductor layer over which is active surface 105. Although a few examples of the material for PIC 104 are described here, any material or structure that may serve as a foundation upon which PIC 104 may be built falls within the spirit and scope of the present disclosure.

In some embodiments, EIC 114 may comprise an IC configured to electrically integrate with PIC 104 to achieve an intended functionality of photonic package 100. For example, EIC 114 may be an Application Specific IC (ASIC), including one or more switch or driver/receiver circuits used in optical communication systems. In some embodiments, EIC 114 may include circuitry for communicating between two or more IC dies, for example, EIC 114 may function as an embedded multi-die interconnect bridge having appropriate circuitry on/in a semiconductor substrate to connect at silicon-interconnect speeds with a small footprint as part of an Omni-Directional Interface (ODI) archi-
tecture, for example, of 2.5D packages. In some embodi-
ments, EIC 114 may comprise active components, including
one or more transistors, voltage converters, trans-impedance
amplifiers (TIA), serializer and de-serializer (SERDES),
clock and data recovery (CDR) components, microcon-
trollers, etc. In some embodiments, EIC 114 may comprise
passive circuitry sufficient to enable interconnection to PIC
104 and other components in photonic package 100 without
any active components. In some embodiments, EIC 114 may
extend under a substantial area of PIC 104. In various
embodiments, EIC 114 and PIC 104 may overlap sufficiently
to enable disposing interconnects 106 with a desired pitch
and number of interconnections that enable photonic pack-
age 100 to function appropriately.

XPU 128 may comprise any suitable integrated chip with
processing functionality, such as Central Processing Unit
(CPU), Graphics Processing Unit (GPU), Field-Program-
mable Gate Array (FPGA), ASIC, and accelerator. In various
embodiments, XPU 128 may be, or include, one or more
voltage converters, Trans Impedance Amplifier (TIA), Clock
and Data Recovery (CDR) components, microcontrollers,
etc. Although FIG. 1A shows XPU 128 and EIC 114 as
separate ICs, in some embodiments, XPU 128 may include
EIC functionality, such that a microelectronic assembly 100
may include XPU 128 and may not include EIC 114.
Although FIG. 1A shows XPU 128 as a single IC, in some
embodiments, XPU 128 may include multiple ICs coupled
by interconnects 106.

In some embodiments, bridge die 202 may comprise
appropriate circuitry on/in a semiconductor substrate to
connect at silicon-interconnect speeds with a small footprint.
In some embodiments, bridge die 202 may comprise active
components, such as transistors and diodes in addition to
bridge circuitry including metallization traces, vias and
passive components for enabling electrical coupling
between two ICs; in other embodiments, bridge die 202 may
include bridge circuitry including metallization traces, vias
and passive components for enabling electrical coupling
between two dies, and may not include active components.

FIG. 1C is a schematic cross-sectional view of a detail of
a particular one of interconnects 106 in microelectronic
assembly 100. Note that although only interconnect 106 is
shown, the same structure and description may apply to any
other such interconnects 106 comprising hybrid bonds in micro-
electronic assembly 100 where applicable. In a general
sense, interconnect 106 may include, at an interface 130
between layers 102-1 and 102-2, metal-metal bonds between
bond-pad 132 of layer 102-1 and bond-pad 134 of layer
102-2, and dielectric-dielectric bonds (e.g., oxide-oxide
bonds) in a dielectric material 109 of layers 102-1 and
102-2. In some embodiments, the structures as illustrated in
the figure may be present in an interface layer (e.g., a
bonding layer) between layers 102-1 and 102-2, and 102-2
and 102-3. In other embodiments, the structures as illus-
trated in the figure may be present in IC dies (e.g., PIC 104,
XPU 128, EIC 114, bridge die 202) of the respective layers.
In yet other embodiments, some structures as illustrated in
the figure may be present in IC dies (e.g., PIC 104, XPU 128,
EIC 114, bridge die 202) of one of the layers, and other
structures may be present outside/around IC dies (e.g., PIC
104, XPU 128, EIC 114, bridge die 202) of the other one of
the layers. Bond-pad 132 of layer 102-1 may bond with
bond-pad 134 of layer 102-2. Dielectric material 108 (e.g.,
silicon oxide, silicon nitride, silicon oxynitride, etc.) in
layers 102-1 and 102-2 may bond with each other. The
bonded metal and dielectric materials form interconnect 106, comprising hybrid bonds, providing electrical and
mechanical coupling between layers 102-1 and 102-2, and
102-2 and 102-3. In various embodiments, interconnects 106
may have a linear dimension of less than 5 micrometers and
a pitch of less than 10 micrometers between adjacent inter-
connects.

A substrate 112 may be coupled to a top surface (e.g.,
surface facing towards the second surface 170-2 of the
plurality of layers 102) of the layer 102-2. In some embodi-
ments, the substrate 112 may comprise a structurally stiff
and thermally conductive base, such as silicon, that may
provide mechanical support and stability to the plurality of
layers 102. In various embodiments, the substrate 112 may
comprise a wafer of silicon cut to suitable proportions to fit
over layers 102. In some embodiments, the substrate 112
may be coupled to the top surface of the layer 102-2 by an
adhesive, by fusion bonding (i.e., dielectric-dielectric bonds
with no metal-metal bonds at the interface), or by hybrid
bonding (e.g., interconnects 106). In some embodiments, as
shown in FIG. 1A, the substrate 112 may not include devices
and/or metal traces. In other embodiments, the substrate 112
may include devices and/or metal traces.

Turning back to FIG. 1A, package substrate 118 may
include conductive pathways (not shown) through an
organic dielectric material. The conductive pathways may
include conductive traces coupled by conductive vias. The
package substrate 118 may further include bond-pads, redis-
tribution layers, substrate cores, passive components and
other elements, which are not shown merely for ease of
illustration and not as limitations. Package substrate 118
may be coupled to the first surface 170-1 of the plurality of
layers 102 by SLIs 142 (e.g., DTPS interconnects, such as
flip-chip solder bonds). In various embodiments, SLI 142
may have a pitch greater than 10 micrometers between
adjacent interconnects. An underfill material 127 may be
disposed around SLIs 142. The underfill process may
include dispensing underfill material in liquid form, allow-
ing the material to flow and fill interstitial gaps around SLIs
142, and subjecting the assembly to a curing process, such
as baking, to solidify the material.

FIG. 1D is a top view of the microelectronic assembly of
FIG. 1A. As shown in FIG. 1D, the microelectronic assem-
bly 100 may include a plurality of PICs 104 surrounded by
substrate 112. Individual ones of PIC 104 may be optically
coupled to individual ones of the fiber connectors 187 on a
bottom surface (underlying portion indicated by the dotted
lines) and extending beyond a dielectric material 108 sur-
rounding the substrate 112 and the PICs 104. Although FIG.
1D shows the microelectronic assembly 100 having three
PIC 104 and three fiber connectors 187. A microelectronic
assembly 100 may have any suitable number of PIC 104 and
fiber connectors 187, as well as XPU 128 and EIC 114,
including one, two, three, or more than three.

Figure 2:
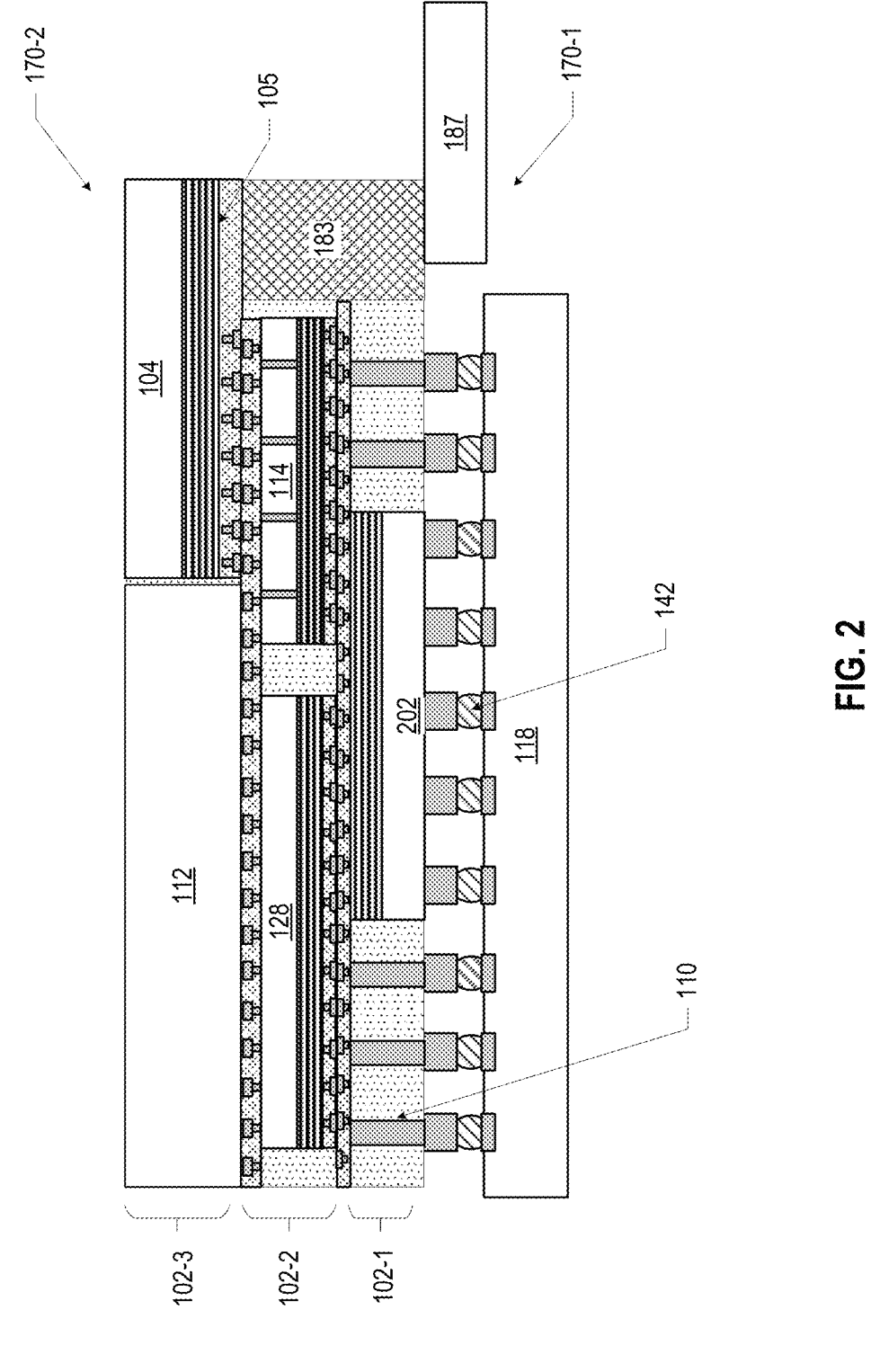
FIG. 2 is a schematic cross-sectional view of another example microelectronic assembly according to some embodiments of the present disclosure.

FIG. 2 is a schematic cross-sectional view of another
example microelectronic assembly according to some
embodiments of the present disclosure. The configuration of
the embodiment shown in the figure is like that of FIG. 1A,
except for differences as described further. The configuration
of microelectronic assembly 100 as described herein
includes an optical component 183, sometimes referred to as
a coupler chiplet (e.g., a chiplet that enables coupling the
optical signal across its two surfaces (i.e., from a top surface
to a bottom surface)). Examples of an optical component
183 include any suitable optical structures for propagating
optical signals between PIC 104 and fiber connector 187,
such as, a glass block, a fiber array block, an optical lens, a
planar lens (e.g., for beam collimation), a micro-lens, a glass block with a reflector, a glass block with a curved surface, a mirror reflector, a multi-directional reflector, a glass block with an arrayed waveguide, a laser written waveguide, and combinations thereof. An optical component 183 may be integrated into the plurality of layers 102 and provide structural support to PIC 104, such that PIC 104 does not have an overhang portion that is not supported (e.g., as shown in FIG. 1A). An optical component 183 may be optically coupled to PIC 104 by evanescent coupling, an optical adhesive or an index matching epoxy to reduce optical loss and enable low loss optical coupling between PIC 104 and fiber connector 187 through the optical component 183.

Figure 3:
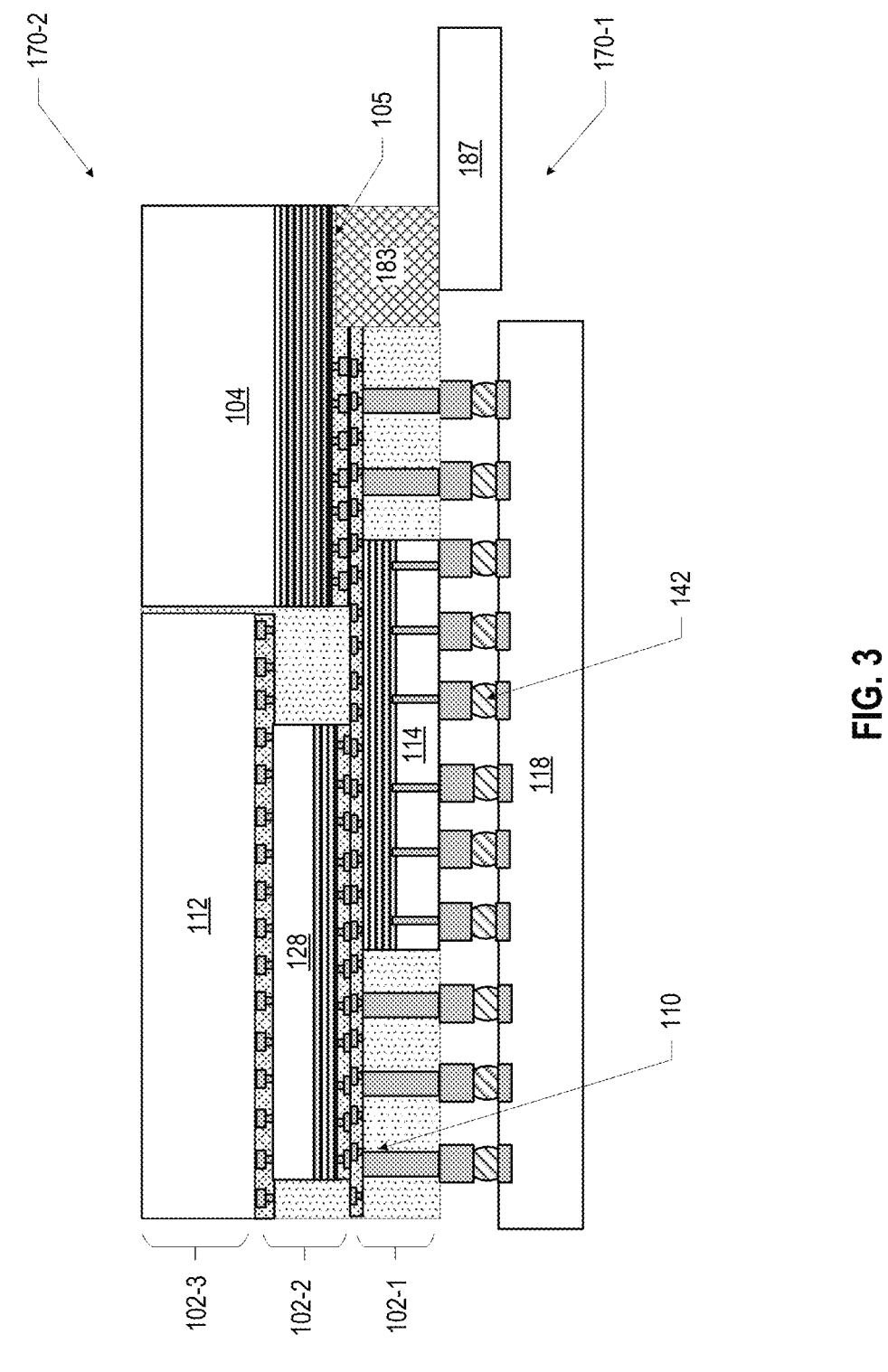
FIG. 3 is a schematic cross-sectional view of yet another example microelectronic assembly according to some embodiments of the present disclosure.

FIG. 3 is a schematic cross-sectional view of another example microelectronic assembly according to some embodiments of the present disclosure. The configuration of the embodiment shown in the figure is like that of FIG. 2, except for differences as described further. As shown in FIG. 3, a microelectronic assembly 100 may not include a bridge die 202 and may include a PIC 104 extending through multiple layers 102. For example, a microelectronic assembly 100 may include a first layer 102-1 having an EIC 114, one or more through-dielectric vias (TDVs) 110, and an optical component 183, a second layer 102-2 having an XPU 128 and a lower portion of a PIC 104, and a third layer 102-3 having a structural substrate 112 and an upper portion of PIC 104 that extends through the layer 102-3. EIC 114 in layer 102-1 may include TSVs 122. EIC 114 may be configured to carry signals between XPU 128 and PIC 104 and power, signals and/or ground connection between package substrate 118 and IC dies (e.g., PIC 104, XPU 128) in the plurality of layers 102.

Figure 4A:
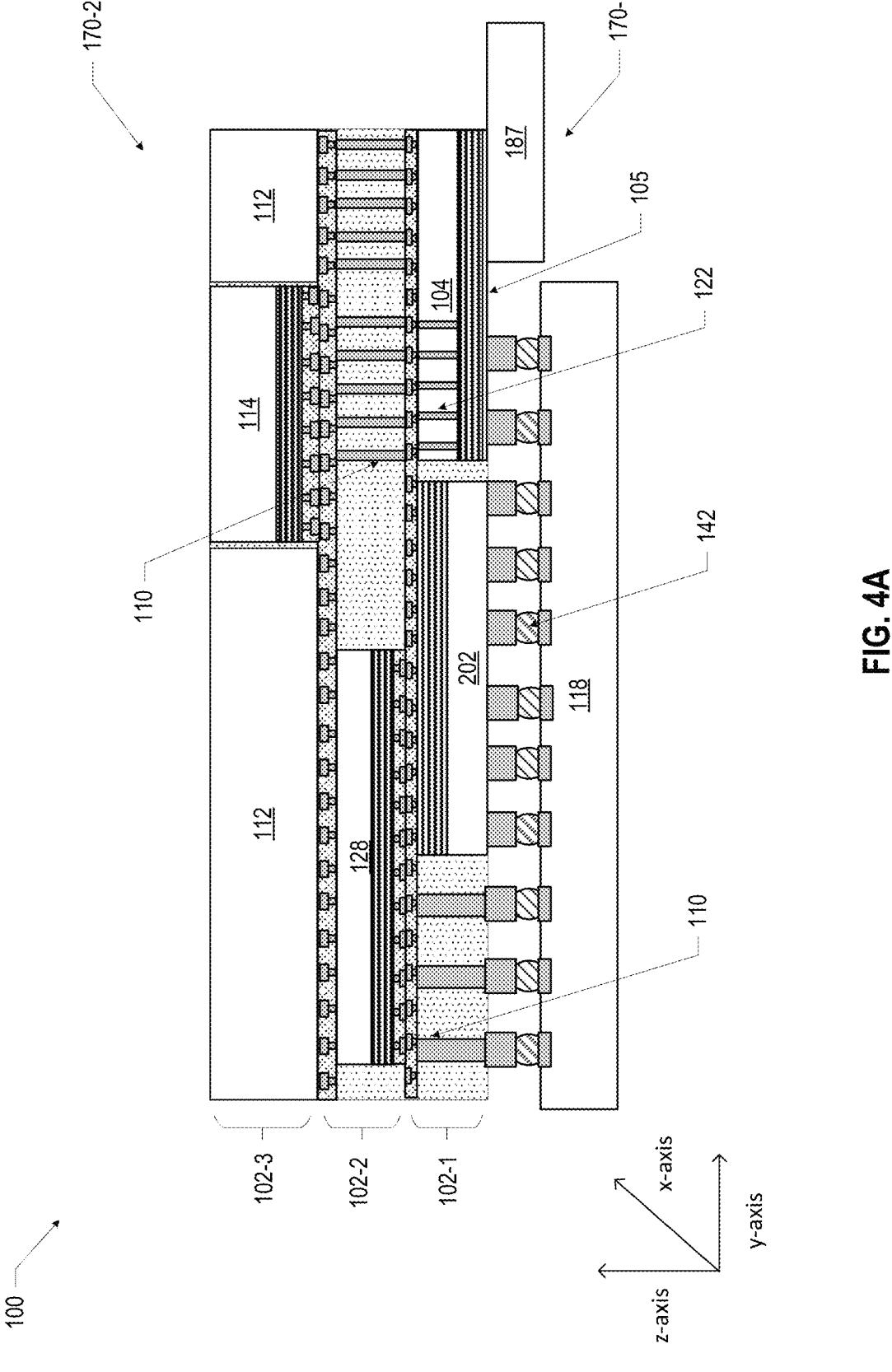
FIGS. 4A and 4B are schematic cross-sectional views of other example microelectronic assemblies according to some embodiments of the present disclosure.

FIG. 4A is a schematic cross-sectional view of another example microelectronic assembly according to some embodiments of the present disclosure. The configuration of the embodiment shown in the figure is like that of FIG. 1A, except for differences as described further. As shown in FIG. 4A, a microelectronic assembly 100 may have IC dies arranged with PIC 104 in a layer 102-1 and EIC 114 in layer 102-3. In particular, a microelectronic assembly 100 may include a first layer 102-1 having PIC 104, a bridge die 202, and one or more TDVs 110, a second layer 102-2 having an XPU 128 and one or more TDVs 110, and a third layer 102-3 having a structural substrate 112 and EIC 114. PIC 104 may have an active surface 105 facing towards a first surface 170-1 of the plurality of layers 102 and a fiber connector 187 may be optically coupled to the active surface 105 of PIC 104. PIC 104 may further include TSVs 122 electrically coupled to TDVs 110 in layer 102-2 and to EIC 114 in layer 102-3. A microelectronic assembly 100 may further include TDVs 110 in layer 102-2 coupled to PIC 104 and substrate 112 to assist with thermal dissipation of heat generated by PIC 104 during use. Although FIG. 4A shows TDVs 110 in layer 102-1 having different dimensions (e.g., a width (i.e., y-dimension), a length (i.e., x-dimension), or a diameter (i.e., xy-dimension or cross-section)) than TDVs 110 in layer 102-2, in some embodiments, TDVs 110 in layers 102-1, 102-2 may have a same dimension.

Figure 4B:
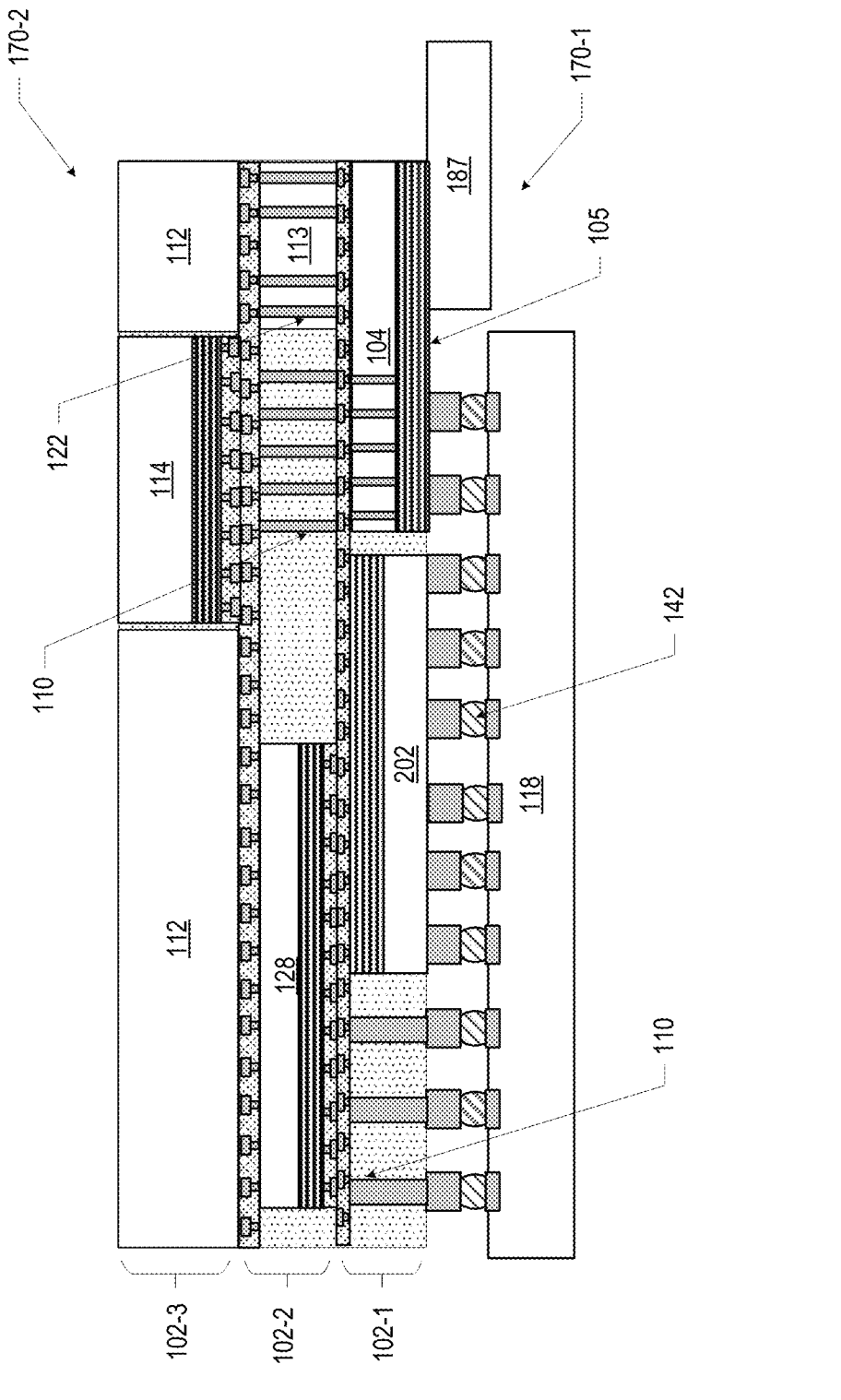

FIG. 4B is a schematic cross-sectional view of another example microelectronic assembly according to some embodiments of the present disclosure. The configuration of the embodiment shown in the figure is like that of FIG. 4A, except for differences as described further. As shown in FIG. 4B, a microelectronic assembly 100 may include a dummy die 113 with TSVs 122 for assisting with thermal dissipation of heat generated by PIC 104 during use rather than TDVs 110 in layer 102-2. A dummy die 113 may include silicon and conductive TSVs 122. In particular, a microelectronic assembly 100 may include a first layer 102-1 having PIC 104, a bridge die 202, and one or more TDVs 110, a second layer 102-2 having an XPU 128, one or more TDVs 110, and a dummy die 113 with TSVs 122, and a third layer 102-3 having a structural substrate 112 and EIC 114. TSVs 122 in dummy die 113 may be electrically coupled to PIC 104 at a bottom surface (e.g., the surface facing towards the first surface 170-1 of the plurality of dies 102) and may be electrically coupled to the substrate 112 in layer 102-3 at a top surface (e.g., the surface facing towards the second surface 170-2 of the plurality of dies 102) to assist with thermal dissipation of heat generated by PIC 104 during use.

Figure 5A:
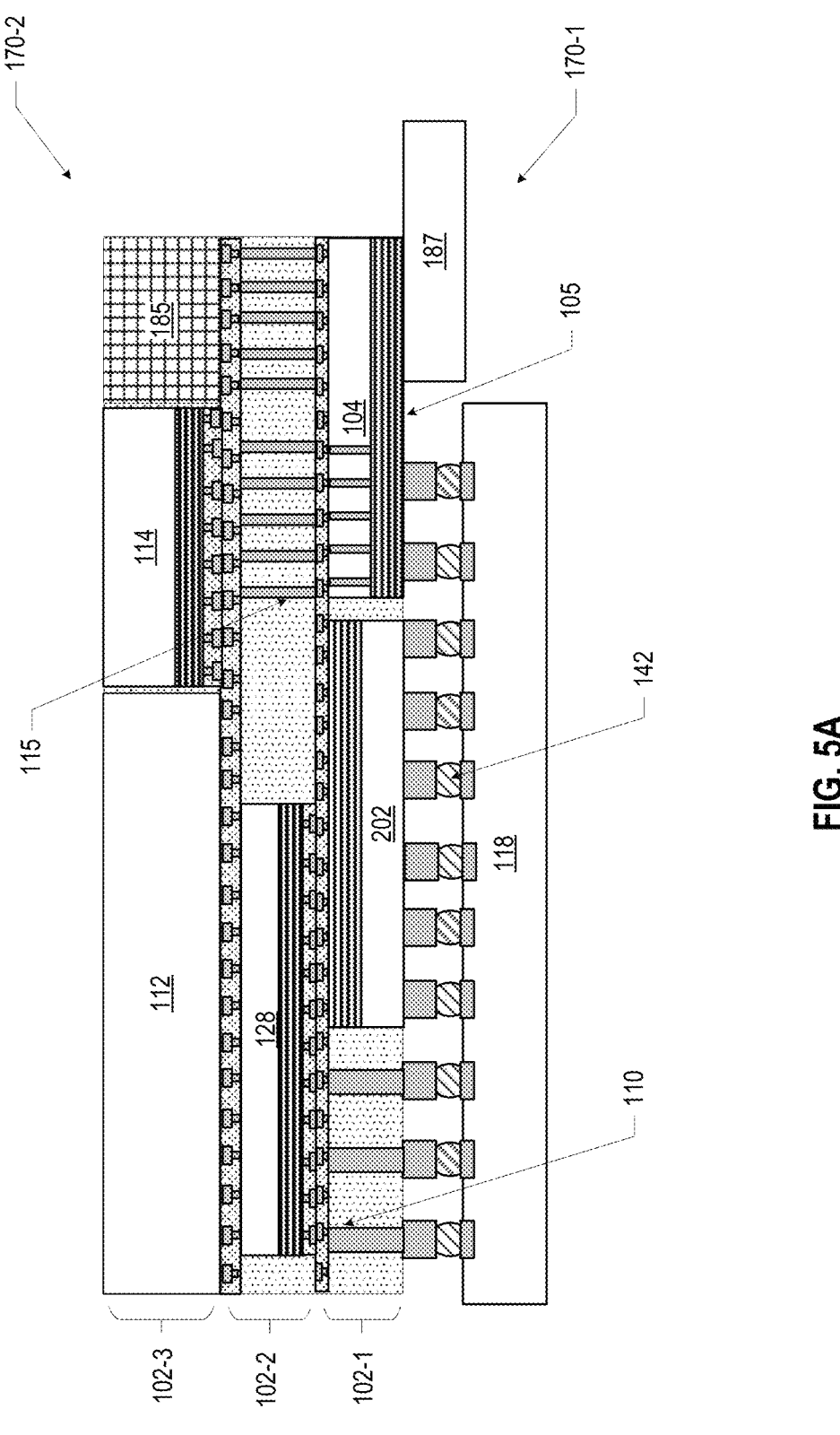
FIGS. 5A-5C are schematic cross-sectional views of other example microelectronic assemblies according to some embodiments of the present disclosure.

FIG. 5A is a schematic cross-sectional view of another example microelectronic assembly according to some embodiments of the present disclosure. The configuration of the embodiment shown in the figure is like that of FIG. 4A, except for differences as described further. As shown in FIG. 5A, a microelectronic assembly 100 may include a thermal electric cooler (TEC) 185 in layer 102-3 for assisting with thermal dissipation of heat generated by PIC 104 during use. A TEC 185 is a cooling system that may be turned on or off, as is known in the art. In particular, a microelectronic assembly 100 may include a first layer 102-1 having PIC 104, a bridge die 202, and one or more TDVs 110, a second layer 102-2 having an XPU 128 and one or more TDVs 110, and a third layer 102-3 having a structural substrate 112, EIC 114, and TEC 185. The TDVs 110 in layer 102-2 may be coupled to PIC 104 and TEC 185 to assist with thermal dissipation of heat generated by PIC 104 during use.

Figure 5B:
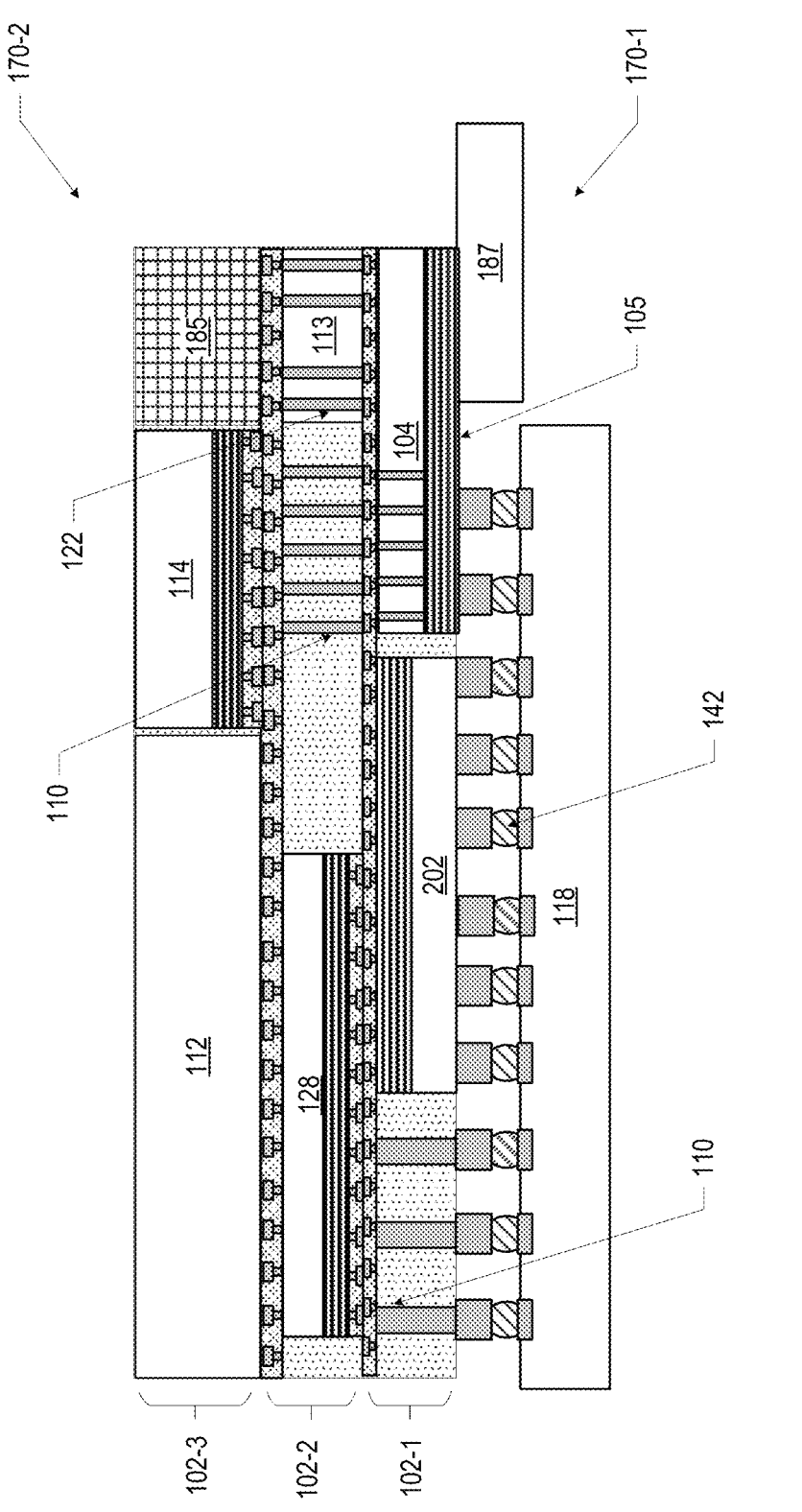

FIG. 5B is a schematic cross-sectional view of another example microelectronic assembly according to some embodiments of the present disclosure. The configuration of the embodiment shown in the figure is like that of FIG. 5A, except for differences as described further. As shown in FIG. 5B, a microelectronic assembly 100 may include a dummy die 113 with TSVs 122 for assisting with thermal dissipation of heat generated by PIC 104 during use rather than TDVs 110 in layer 102-2. In particular, a microelectronic assembly 100 may include a first layer 102-1 having PIC 104, a bridge die 202, and one or more TDVs 110, a second layer 102-2 having an XPU 128, one or more TDVs 110, and a dummy die 113 with TSVs 122, and a third layer 102-3 having a structural substrate 112, EIC 114, and TEC 185. TSVs 122 in dummy die 113 may be electrically coupled to PIC 104 at a bottom surface (e.g., the surface facing towards the first surface 170-1 of the plurality of dies 102) and may be electrically coupled to the TEC 185 in layer 102-3 at a top surface (e.g., the surface facing towards the second surface 170-2 of the plurality of dies 102) to assist with thermal dissipation of heat generated by PIC 104 during use.

Figure 5C:
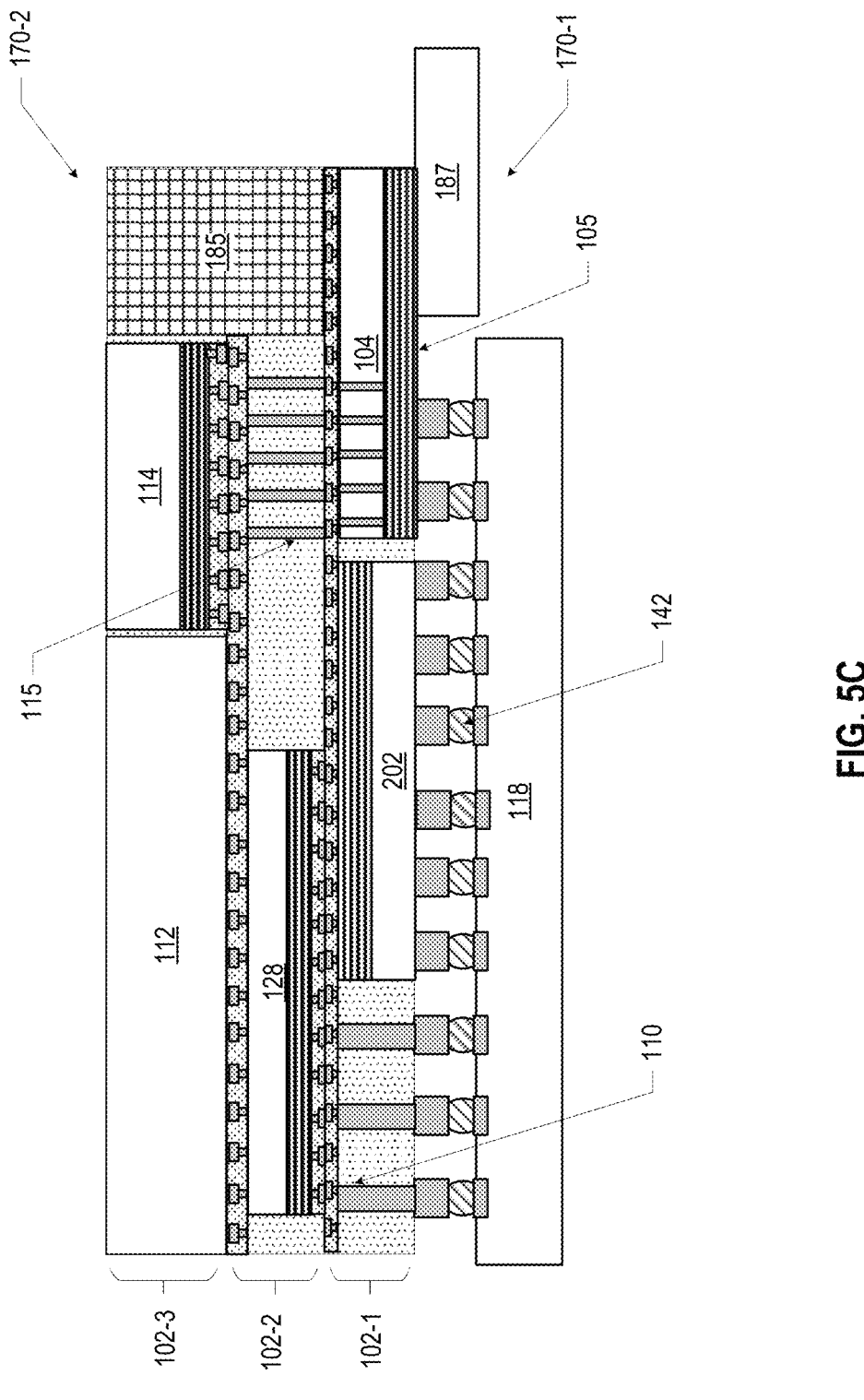

FIG. 5C is a schematic cross-sectional view of another example microelectronic assembly according to some embodiments of the present disclosure. The configuration of the embodiment shown in the figure is like that of FIG. 5A, except for differences as described further. As shown in FIG. 5C, a microelectronic assembly 100 may include a thermal electric cooler (TEC) 185 extending through layers 102-2 and 102-3 for assisting with thermal dissipation of heat generated by PIC 104 during use. In particular, a microelectronic assembly 100 may include a first layer 102-1 having PIC 104, a bridge die 202, and one or more TDVs 110, a second layer 102-2 having an XPU 128, one or more TDVs 110, and a lower portion of TEC 185, and a third layer 102-3 having a structural substrate 112, EIC 114, and an upper portion of TEC 185. The TEC 185 may be coupled to PIC 104 to assist with thermal dissipation of heat generated by PIC 104 during use.

Figure 6A:
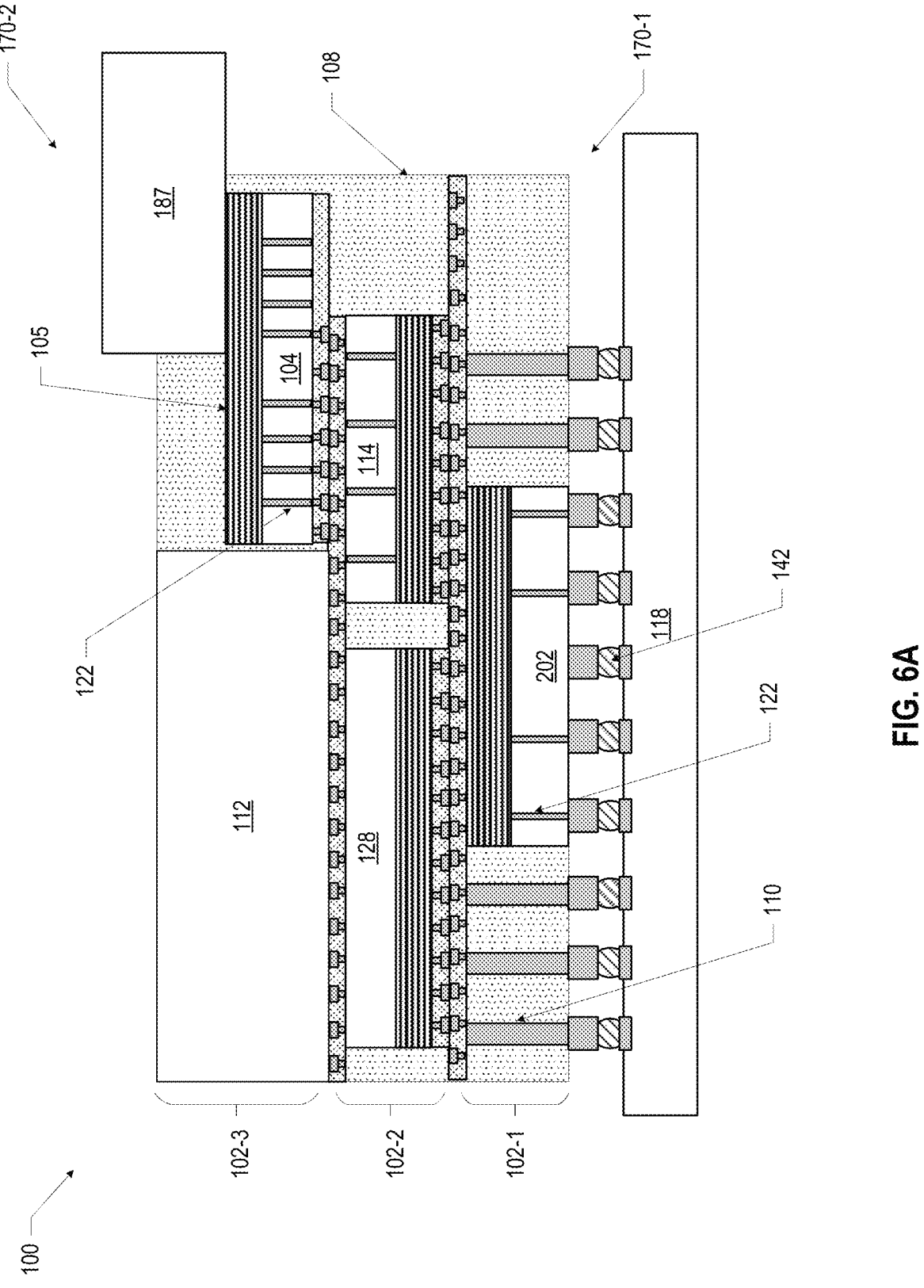
FIGS. 6A and 6B are schematic cross-sectional views of other example microelectronic assemblies according to some embodiments of the present disclosure.

FIG. 6A is a schematic cross-sectional view of another example microelectronic assembly according to some embodiments of the present disclosure. The configuration of the embodiment shown in the figure is like that of FIG. 1A, except for differences as described further. As shown in FIG. 6A, a microelectronic assembly 100 may include a first layer 102-1 having a bridge die 202 and one or more TDVs 110, a second layer 102-2 having an XPU 128 and EIC 114, and a third layer 102-3 having a structural substrate 112 and PIC 104. PIC 104 may have an active surface 105 facing towards a second surface 170-2 of the plurality of layers 102 and a fiber connector 187 may be optically coupled to the active surface 105 of PIC 104. PIC 104 may further include TSVs 122 electrically coupled to TSVs 122 in EIC 114 in layer 102-2. By facing the active surface 105 of PIC 104 towards the second surface 170-2 of the plurality of layers 102, the dielectric material 108 in layers 102-1, 102-2 is not removed (e.g., is not etched to expose the active surface 105 of PIC 104 when facing towards the first surface 170-1, as shown in FIG. 1A) and, as such, may provide more structural support and stability to the microelectronic assembly 100.

Figure 6B:
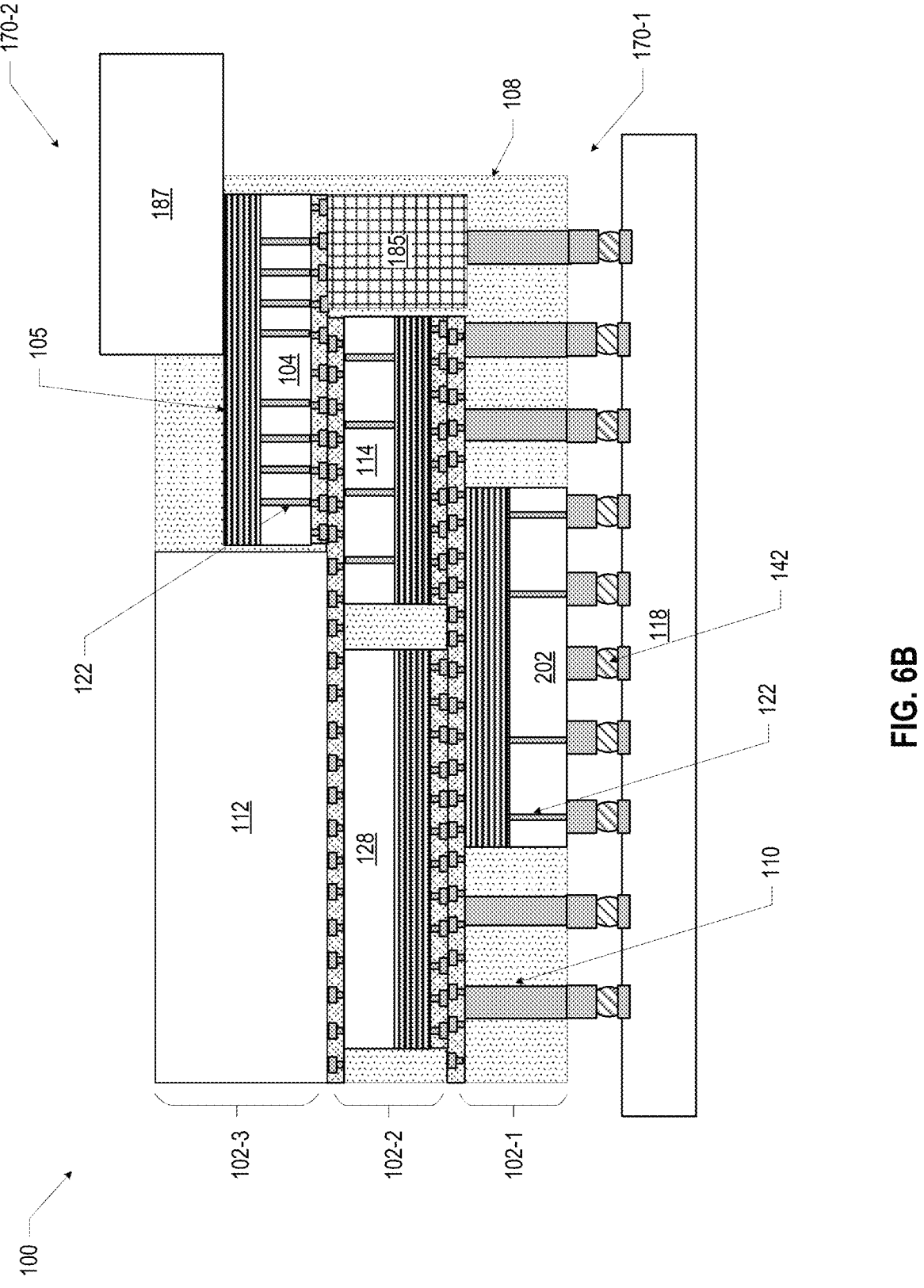

FIG. 6B is a schematic cross-sectional view of another example microelectronic assembly according to some embodiments of the present disclosure. The configuration of the embodiment shown in the figure is like that of FIG. 6A, except for differences as described further. As shown in FIG. 6B, a microelectronic assembly 100 may include a first layer 102-1 having a bridge die 202 and one or more TDVs 110, a second layer 102-2 having an XPU 128, EIC 114, and TEC 185, and a third layer 102-3 having a structural substrate 112 and PIC 104. PIC 104 may have an active surface 105 facing towards a second surface 170-2 of the plurality of layers 102 and TSVs 122. TEC 185 in layer 102-2 may be coupled to one or more TDVs 110 in layer 102-1 and to PIC 104 in layer 102-3. The TEC 185 may assist with thermal dissipation of heat generated by PIC 104 during use.

Any suitable techniques may be used to manufacture the microelectronic assemblies 100 disclosed herein. For example, FIGS. 7A-7J are side, cross-sectional views of various stages in an example process for manufacturing the microelectronic assembly 100 of FIG. 1A, in accordance with various embodiments. Although the operations discussed below with reference to FIGS. 7A-7J (and others of the accompanying drawings representing manufacturing processes) are illustrated in a particular order, these operations may be performed in any suitable order. Further, additional operations which are not illustrated may also be performed without departing from the scope of the present disclosure. Also, various ones of the operations discussed herein with respect to FIGS. 7A-7J may be modified in accordance with the present disclosure to fabricate others of microelectronic assembly 100 disclosed herein.

Figure 7A:
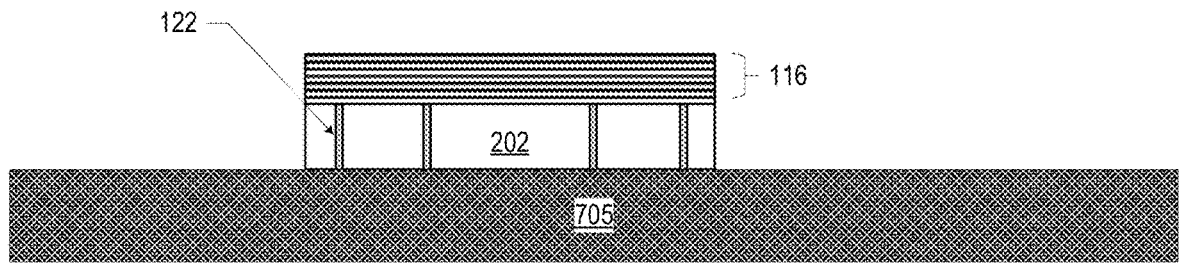
FIGS. 7A-7J are schematic cross-sectional views of different stages of an example process for manufacturing the microelectronic assembly of FIG. 1A according to some embodiments of the present disclosure.

FIG. 7A illustrates an assembly subsequent to mounting bridge die 202 (e.g., layer 102-1 die) on a carrier 705 with a metallization stack facing away from the carrier 705. In some embodiments, as shown, the bridge die 202 may include TSVs 122. A carrier 705 may include any suitable material for providing mechanical stability during manufacturing operations, and in some embodiments, may include a semiconductor wafer (e.g., a silicon wafer) or glass (e.g., a glass panel). Any suitable method may be used to place bridge die 202 for example, automated pick-and-place. Any suitable technique may be used to attach the bridge die 202 to the carrier, including a removable adhesive. In some embodiments, a top surface of the carrier 705 may include a bonding layer, such as a dielectric material 108 or a bonding layer 124 as described below with respect to FIG. 7D, and the bridge die 202 may be attached to the carrier 705 by fusion bonding or by hybrid bonding.

Figure 7B:
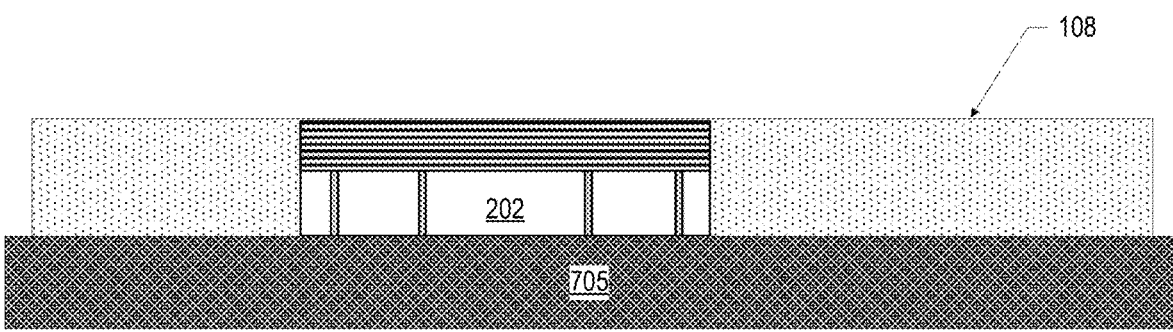

FIG. 7B illustrates an assembly subsequent to depositing a dielectric material 108 on a top surface of the assembly of FIG. 7A and planarizing a top surface of the assembly to remove dielectric material. The dielectric material 108 may be deposited using any suitable technique, such as chemical vapor deposition, physical vapor deposition, and plasma enhanced chemical vapor deposition, among others. In some embodiments, the dielectric material 108 may be dispensed in liquid form to flow around and conform to various shapes of components and metallization, and, subsequently, may be subjected to a process, for example, curing, that solidifies the dielectric material 108. In other embodiments, the dielectric material 108 may be deposited then reflown to improve its planarity for subsequent processing. The top surface of the assembly may be planarized using any suitable technique, such as grinding or etching, and subsequently by chemical mechanical polishing (CMP).

Figure 7C:
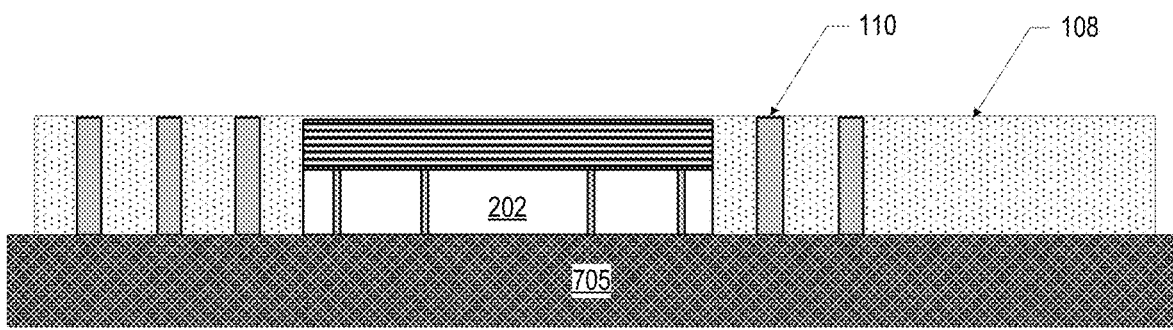

FIG. 7C illustrates an assembly subsequent to forming via openings through the dielectric material 108 and depositing a conductive material, such as a metal, in the openings to form TDVs 110. The via openings may be formed using any suitable technique, such as laser drilling, where the via opening has a tapered or conical shape. The conductive material may be deposited using any suitable technique, such as electroplating.

Figure 7D:
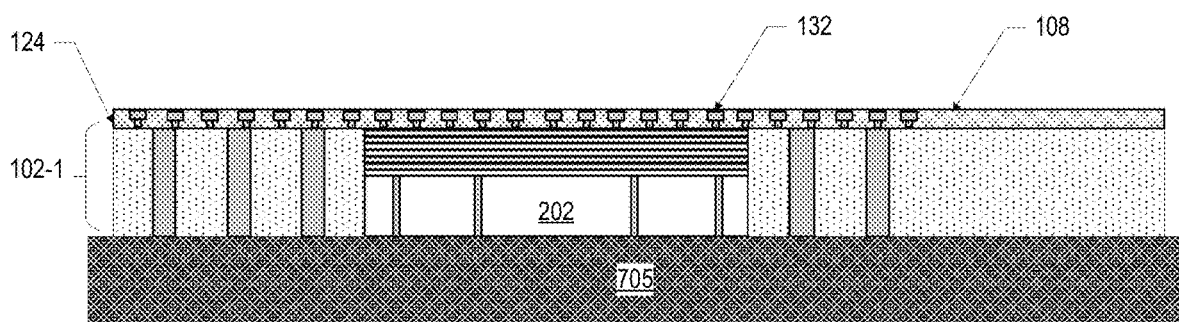
Figure 7E:
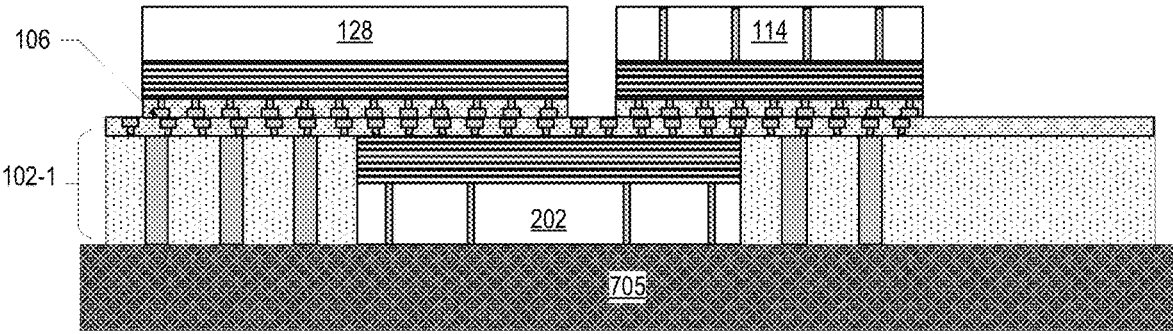

FIG. 7D illustrates an assembly subsequent to forming a bonding layer 124 on a top surface to the assembly. The bonding layer 124 may include bond-pads 132 in a dielectric material 108, as described above with reference to FIG. 1C. The bond-pads 132 may correspond to bond-pads 134 for forming hybrid direct bonds (e.g., interconnects 106 as shown in FIG. 7E). Although FIG. 7D illustrates bond-pads 132 present in a portion of the bonding layer 124, in some embodiments, bond-pads 132 may be present in the entire bonding layer 124 (e.g., bond-pads 132 may extend along the entire surface of the assembly).

FIG. 7E illustrates an assembly subsequent to attaching XPU 128 and EIC 114, which may include TSVs 122, to bonding layer 124 and forming interconnects 106. The assembly of FIG. 6E may be subjected to appropriate bonding processing to form interconnects 106. For example, the bonding process may include applying a suitable pressure and heating to a suitable temperature (e.g., to moderately high temperatures, e.g., between about 50 and 200 degrees Celsius) for a duration of time. In some embodiments, a bonding material may be applied at interface between XPU 128 and EIC 114, and bonding layer 124. In some embodiments, the bonding material may be an adhesive that ensures attachment of XPU 128 and EIC 114 to bonding layer 124. In other embodiments, the bonding material may be an etch-stop material. In yet other embodiments, the bonding material may be both an etch-stop material and have suitable adhesive properties to ensure attachment of XPU 128 and EIC 114 to bonding layer 124. In yet other embodiments, no bonding material may be used.

Figure 7F:
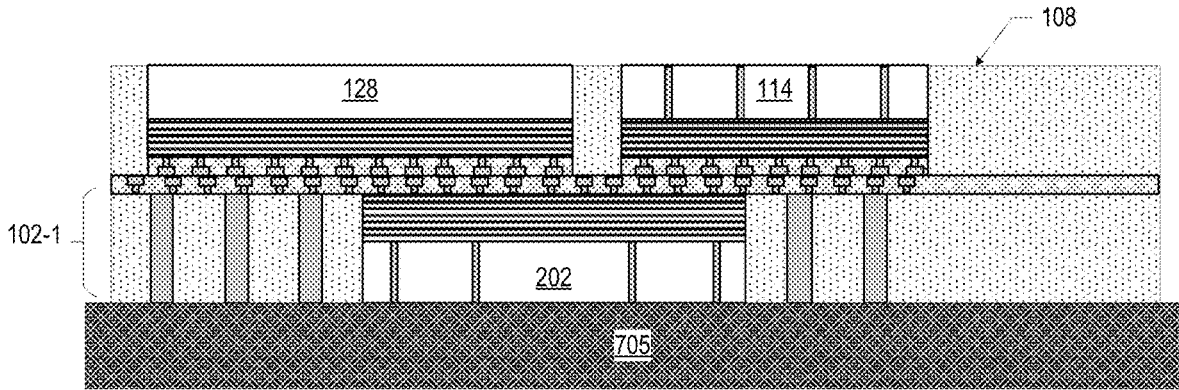

FIG. 7F illustrates an assembly subsequent to forming layer 102-2 by disposing a dielectric material 108 on a top surface of the assembly of FIG. 7E (e.g., on and around XPU 128 and EIC 114 and a top surface of the bonding layer 124). In some embodiments, dielectric material 108 around the bridge die 202 may be a same material as dielectric material 108 around XPU 128 and EIC 114. In some embodiments, dielectric material 108 around bridge die 202 may be a different material than dielectric material 108 XPU 128 and EIC 114.

Figure 7G:
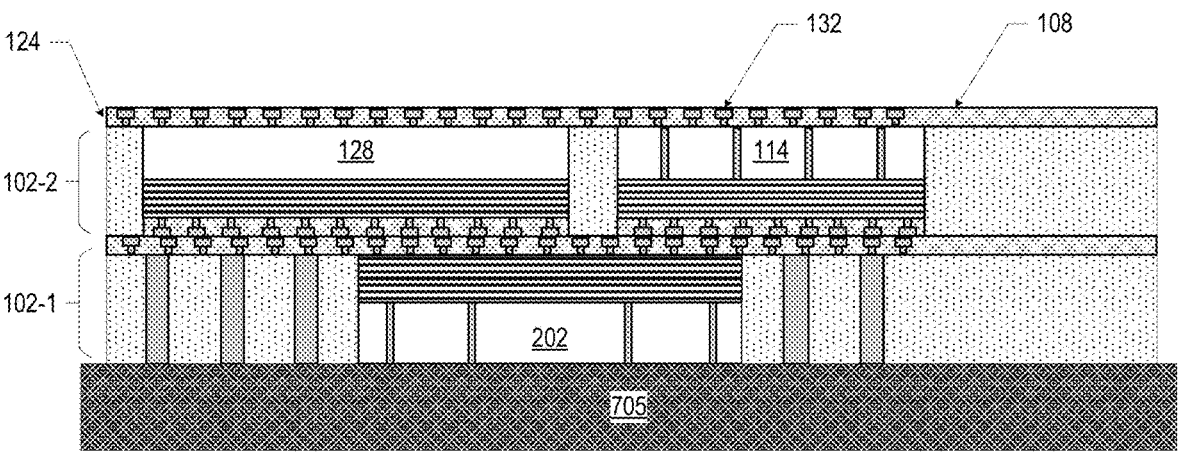

FIG. 7G illustrates an assembly subsequent to forming a bonding layer 124 on a top surface to the assembly of FIG. 7F. The bonding layer 124 may include bond-pads 132 in a dielectric material 108, as described above with reference to FIG. 1C. The bond-pads 132 may correspond to bond-pads 134 for forming hybrid direct bonds (e.g., interconnects 106 as shown in FIG. 7H).

Figure 7H:
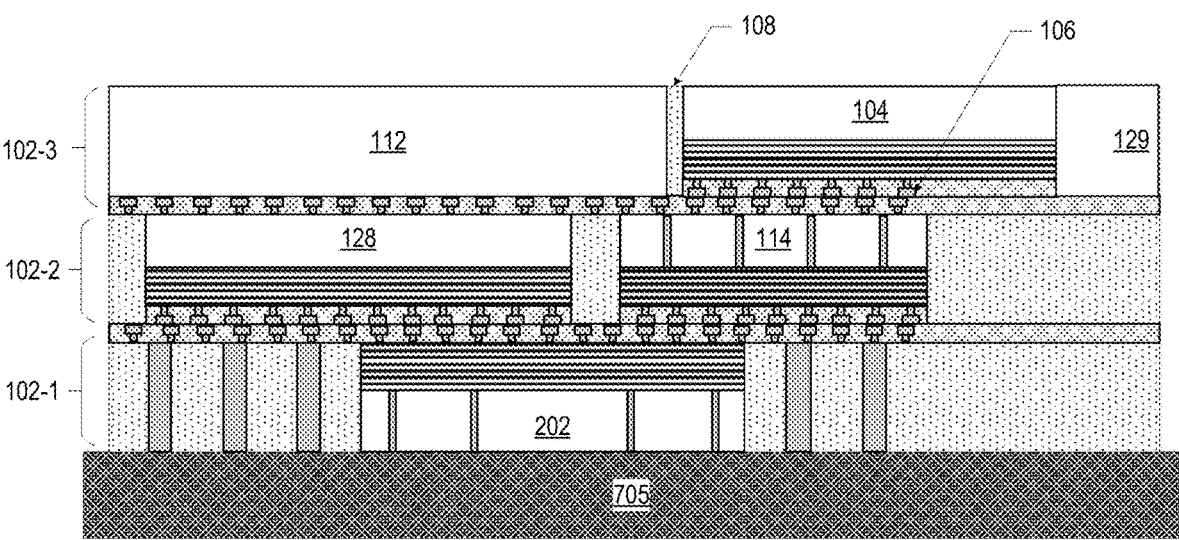

FIG. 7H illustrates an assembly subsequent to forming layer 102-3 by attaching PIC 104, a substrate 112, and a support material 129 to bonding layer 124 and forming interconnects 106. The assembly of FIG. 7H may be subjected to appropriate bonding processing to form interconnects 106 between PIC 104 and EIC 114, as described above with reference to FIG. 7E. The substrate 112 and support material 129 may be attached to the bonding layer 124 using any suitable technique, including by hybrid bonding, fusion bonding or oxide-to-oxide bonding. In some embodiments, a dielectric material 108 may be deposited on and between PIC 104, the substrate 112, and the support material 129, and a top surface of the dielectric material 108 may be planarized. The processes described in FIGS. 7A-7H, and portions thereof, may be repeated any number of times as desired to make a microelectronic assembly 100 including any number of layers 102 and any number of dies within in an individual layer 102.

Figures 7I, 7J:
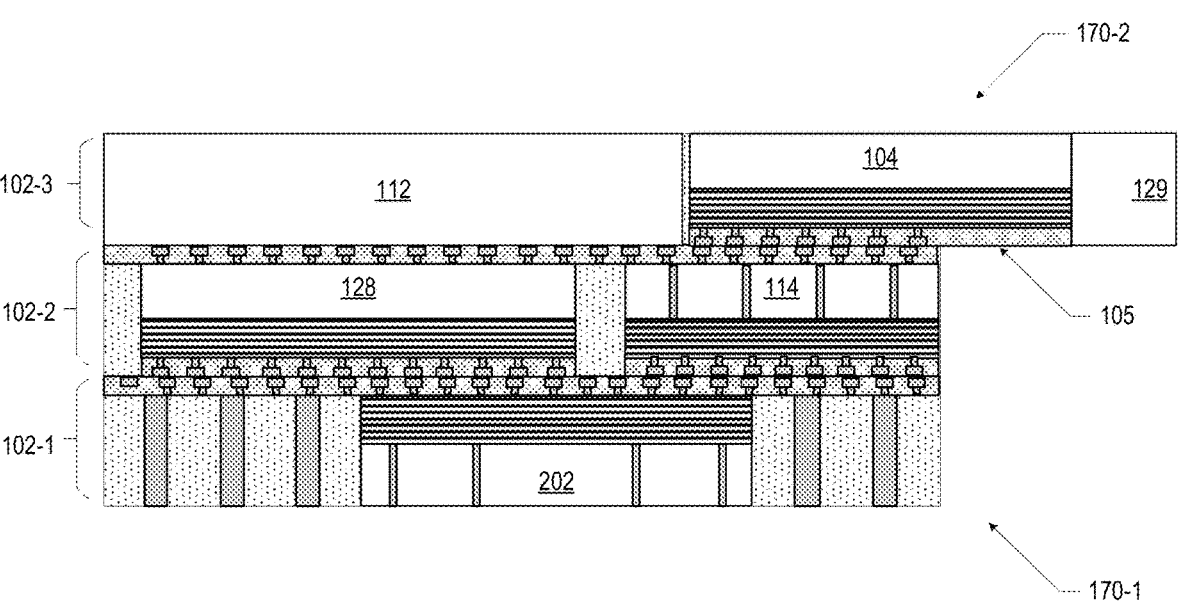

FIG. 7I illustrates an assembly subsequent to removing the carrier 705 from the first surface 170-1 of the plurality of layers 102 and removing a portion of the dielectric material 108 from layers 102-1, 102-2 to reveal the active surface 105 of PIC 104. The dielectric material 108 may be removed using any suitable technique, including etching, mechanical milling, or laser ablation. The active surface 105 of PIC 104 may be further subjected to grinding and polishing to form an optically smooth surface. In some embodiments, for example, the microelectronic assembly 100 in FIGS. 6A and 6B, a dielectric material 108 may be removed from a top surface 170-2 of the plurality of layers 102 (e.g., from layer 102-3) to expose the active surface 105 of PIC 104.

FIG. 7J illustrates an assembly subsequent to optically coupling a fiber connector 187 to the active surface 105 of PIC 104 and performing finishing operations on a bottom surface 170-1. Fiber connector 187 may be optically aligned, if necessary, and optically coupled using any suitable technique, such as optical glue or oxide-to-oxide bonding. Example finishing operations include forming conductive contacts 746, depositing solder resist (not shown), and depositing solder 742 on a bottom surface of conductive contacts 746. If multiple assemblies are manufactured together, the assemblies may be singulated. The assembly of FIG. 7J may itself be a microelectronic assembly 100, as shown. Further manufacturing operations may be performed on the microelectronic assembly 100 of FIG. 7J to form other microelectronic assembly 100. For example, the solder 742 of microelectronic assembly 100 of FIG. 7J may be electrically coupled to a package substrate 118 to form SLIs 142, similar to the microelectronic assembly 100 of FIG. 1A.

Figure 8A:
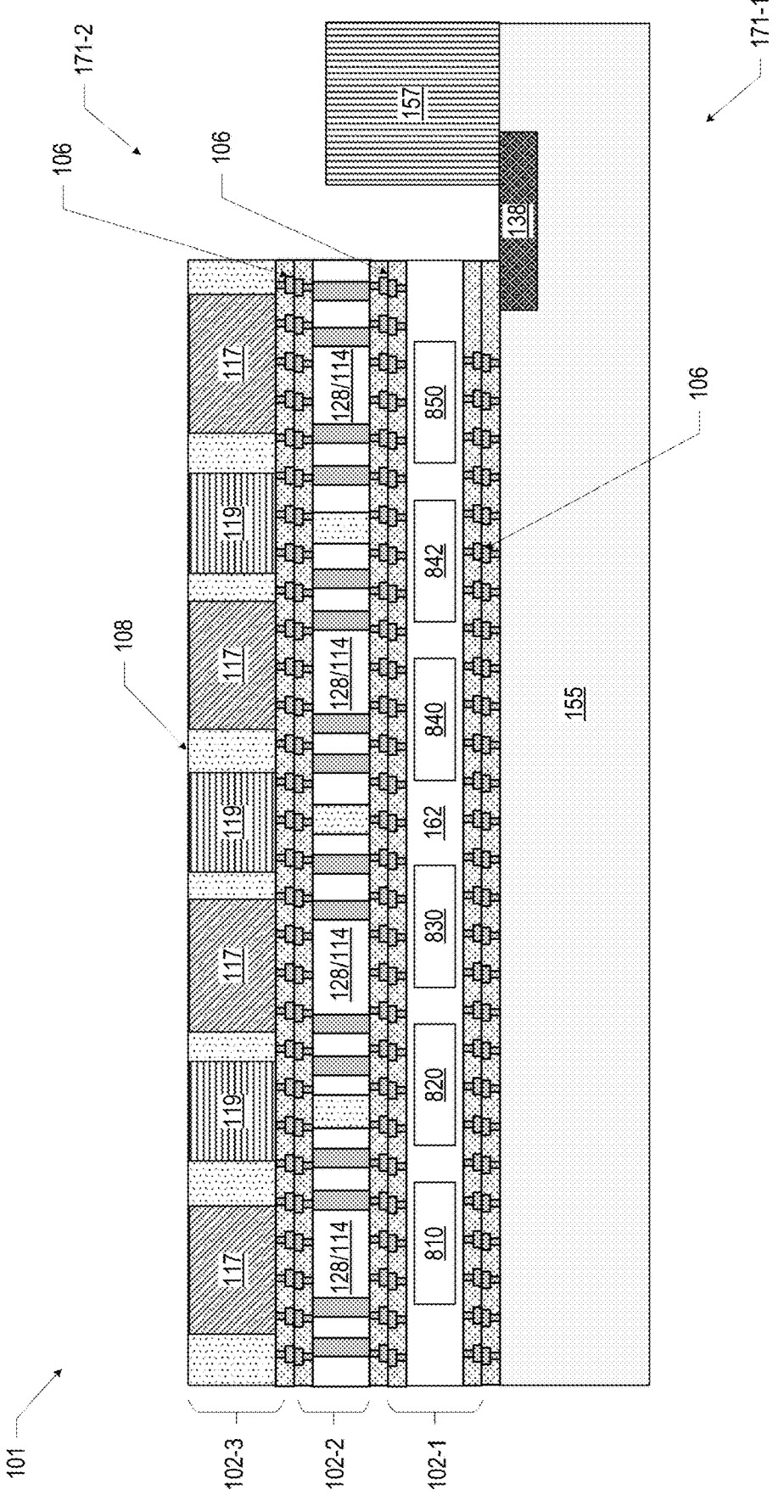
FIG. 8A is a schematic cross-sectional view of yet another example microelectronic assembly according to some embodiments of the present disclosure.

FIG. 8A is a schematic cross-sectional view of yet another example microelectronic assembly according to some embodiments of the present disclosure. The microelectronic assembly 101 of FIG. 8A may provide for processing and routing of data signals, and pass-through power delivery on a wafer scale or a panel scale compute platform. As shown in FIG. 8A, a microelectronic assembly 101 may include a power delivery connector 155, a PIC base substrate 162 in a first layer 102-1, a plurality of XPU 128 in a second layer 102-2, and a plurality of stacked dies 117 and jump over chiplets (JOC) 119 in a third layer 102-3. The adjacent layers 102 may be electrically coupled by interconnects 106. The power delivery connector 155 may include any suitable connector for delivering power, such as a socket. The power delivery connector 155 may include an optical source 157, such as a continuous wave laser source, optically coupled to an optical connector 138. In some embodiments, the optical source 157 may not be attached to a surface of the power delivery connector 155 and may be located "off-board." PIC base substrate 162 may include optical elements of a PIC (e.g., as described about with reference to FIG. 1B) and may further include one or more of a modulator 810, a resonator 820, a photodetector 830, an optical node 842, and a waveguide network 840. A modulator 810 may be configured for light modulation, a resonator 820 may be configured for switching the light, and photodetector 830 may be configured for detecting optical signals. An optical node 842 may be configured for determining whether a data signal should undergo light modulation, pass-through/routing, or detection. A waveguide network 840 may be configured to provide optical high-speed connectivity between XPUs 128 in layer 102-2, and may include lateral optical connectivity to the XPUs 128, as shown in FIG. 8C. The waveguide network 840 may be optically coupled to the optical connector 138 in the power delivery connector 155. XPU 128 may have EIC 114 integrated therein for determining whether a data signal should be passed through unmodulated, routed through the waveguide network 840, read by the photodetector 830, or encoded by the modulator 810. A resonator 820 may include micro-ring resonators (MRRs). In some embodiments, the MRRs may function as an optical add/drop filter that adds or removes certain wavelengths/ frequencies while the remaining signal passes through with minimal loss. In some embodiments, the MRRs may function to couple different wavelengths/frequencies together before passing the signal through. The JOCs 119 may include conductive pathways (not shown) that may enable fast, high bandwidth close by data signal transfer between XPU 128 and the stacked dies 117. In some embodiments, the waveguide network 840 may further include Distributed Bragg Reflectors (DBR) as wavelength selectivity mechanisms. The stacked dies 117 may include any type of dies, including, for example, memory dies. For example, the microelectronic assembly 101 may enable data transmission across composite compute assemblies to provide for Non uniform Memory Architecture (NUMA) and Uniform Memory Architecture (UMA) solutions. PIC base substrate 162 may further include a power delivery network 850 configured to route electrical power from the power delivery connector 155 to the IC dies (e.g., 128/114, 117, 119) in the layers 102-2, 102-3. In some embodiments, a power delivery network 850 may include TSVs (not shown) through the PIC base substrate 162.

Figure 8B:
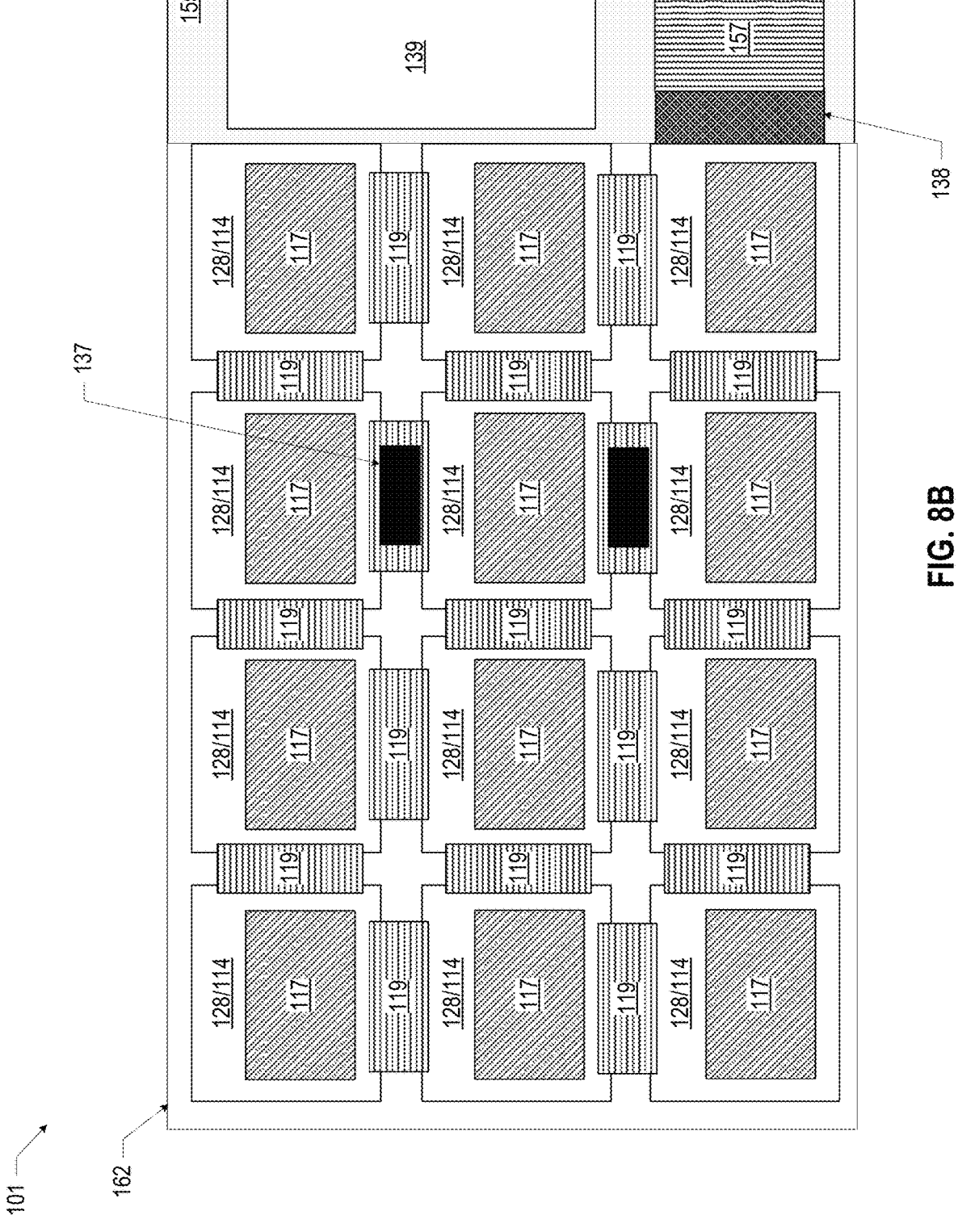
FIG. 8B is top view of the example microelectronic assembly of FIG. 8A.
Figure 8C:
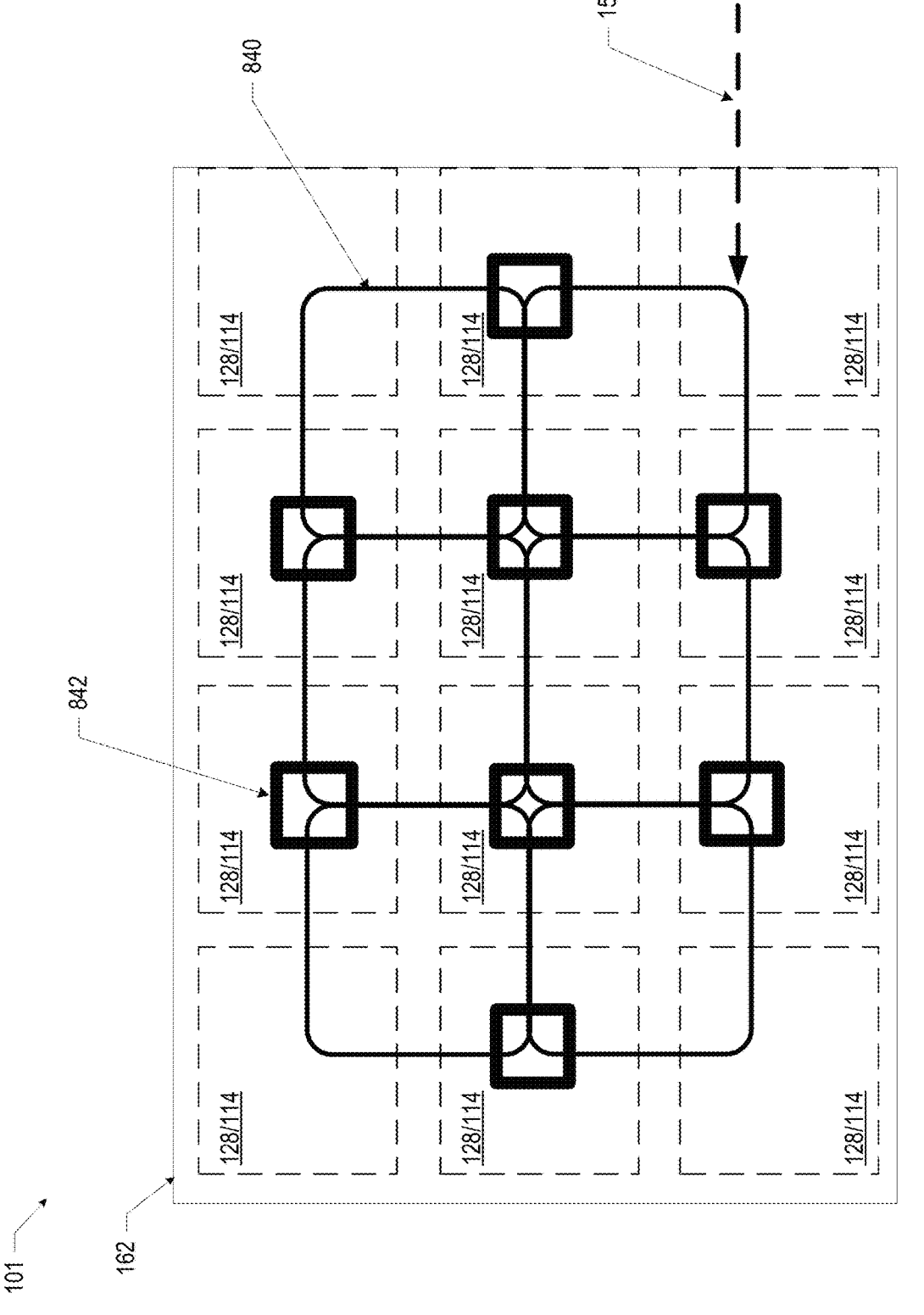
FIG. 8C is a top view of the PIC in the example microelectronic assembly of FIG. 8A.

FIG. 8B is top view of the example microelectronic assembly of FIG. 8A. As shown in FIG. 8B, PIC base substrate may be electrically couple to the power delivery connector 155 and XPU 128 may be electrically coupled to PIC base substrate 162. The stacked dies 117 may be on top of and electrically coupled to XPU 128. The JOCs 119 may be on top of and overlapping adjacent XPUs 128. The JOCs 119 may be electrically coupled to adjacent XPUs 128. In some embodiments, the microelectronic assembly 101 may further include a local dense interconnect (LDI) chiplet 137 for high density connections between adjacent XPUs 128 by interconnects, such as interconnects 106, as described in FIG. 1. In some embodiments, the LDI chiplet 137 may use active repeaters. The microelectronic assembly 101 may further include an electrical connector 139.

FIG. 8C is a top view of the PIC base substrate in the example microelectronic assembly of FIG. 8A. As shown in FIG. 8C, PIC base substrate 162 may include a waveguide network 840 The optical source 157 may enter in the waveguide network 840 via the optical connector 138 (e.g., as shown in FIG. 8A). PIC base substrate 162 may include an optical node 842 for determining whether a data signal should undergo light modulation, pass-through/routing, or detection. In some embodiments, the waveguide network 840 may include multiple lanes. In some embodiments, the waveguide network 840 may be multiplexed into a single lane.

FIG. 9 is a flow diagram of an example method of fabricating an example microelectronic assembly, in accordance with various embodiments. At 902, first layer die (e.g., bridge die 202) may be attached to a carrier 705 with a metallization layer 116 facing away from the carrier 705. The first layer die may be coupled to the carrier 705 using any suitable technique, including by adhesive, by fusion bonding, or by forming hybrid direct bonds.

At 904, a dielectric material 108 is deposited on and around the first layer die and on a top surface of the carrier 705 and TDVs 110 may be formed through the dielectric material 108. The dielectric material 108 may be deposited using any. A top surface of that dielectric material 108 may be planarized, using CMP or any other suitable process. The TDVs 110 may be formed by forming via openings through the dielectric material 108 and depositing a conductive material in the via openings.

At 906, a bonding layer 124 may be formed on a top surface of the first layer die and the dielectric layer 108. Bonding layer 124 may include bond-pads 132 surrounded by a dielectric material 109.

At 908, second layer die (e.g., XPU 128 and EIC 114) may be attached to a top surface of bonding layer 124. Interconnects 106 are formed to electrically couple second layer die to first layer die and TDVs 110. Any suitable bonding process may be used to form interconnects 106, such as applying a suitable pressure and heating to a suitable temperature for a duration of time.

At 910, a dielectric material 108 may be deposited on and around second layer die and on a top surface of the bonding layer 124. A top surface of the dielectric material 108 may be planarized using CMP or any other suitable process. In embodiments where second layer 102-2 includes TDVs 110, as shown in FIGS. 4 and 5, TDVs 110 may be formed as described above with reference to operation 904.

At 912, a bonding layer 124 may be formed on a top surface of the second layer die and the dielectric layer 108. Bonding layer 124 may include bond-pads 132 surrounded by a dielectric material 109.

At 914, third layer die (e.g., PIC 104), a substrate 112, and, optionally, a support material 129 may be attached to a top surface of bonding layer 124. Interconnects 106 are formed to electrically couple third layer die (e.g., PIC 104) to second layer die (e.g., EIC 114) and, if present, TDVs 110. Any suitable bonding process may be used to form interconnects 106, such as applying a suitable pressure and heating to a suitable temperature for a duration of time. Substrate 112 and support material 129 may be attached using any suitable means, including fusion bonding and hybrid bonding.

At 916, the carrier 705 may be removed, dielectric material 108 may be removed to expose an active surface 105 of PIC 104, and a fiber connector may be optically connected to the active surface 105 of PIC 104. The fiber connector may be optically aligned and optically attached using any suitable process, including oxide-to-oxide bonding.

At 918, the assembly may be singulated and surface finishing operations may be performed. In some embodiments, surface finishing operations may be performed prior to singulation. Surface finishing operations may include, for example, forming conductive contacts, dispensing solder resist, and attaching solder balls at a bottom surface.

Figure 10:
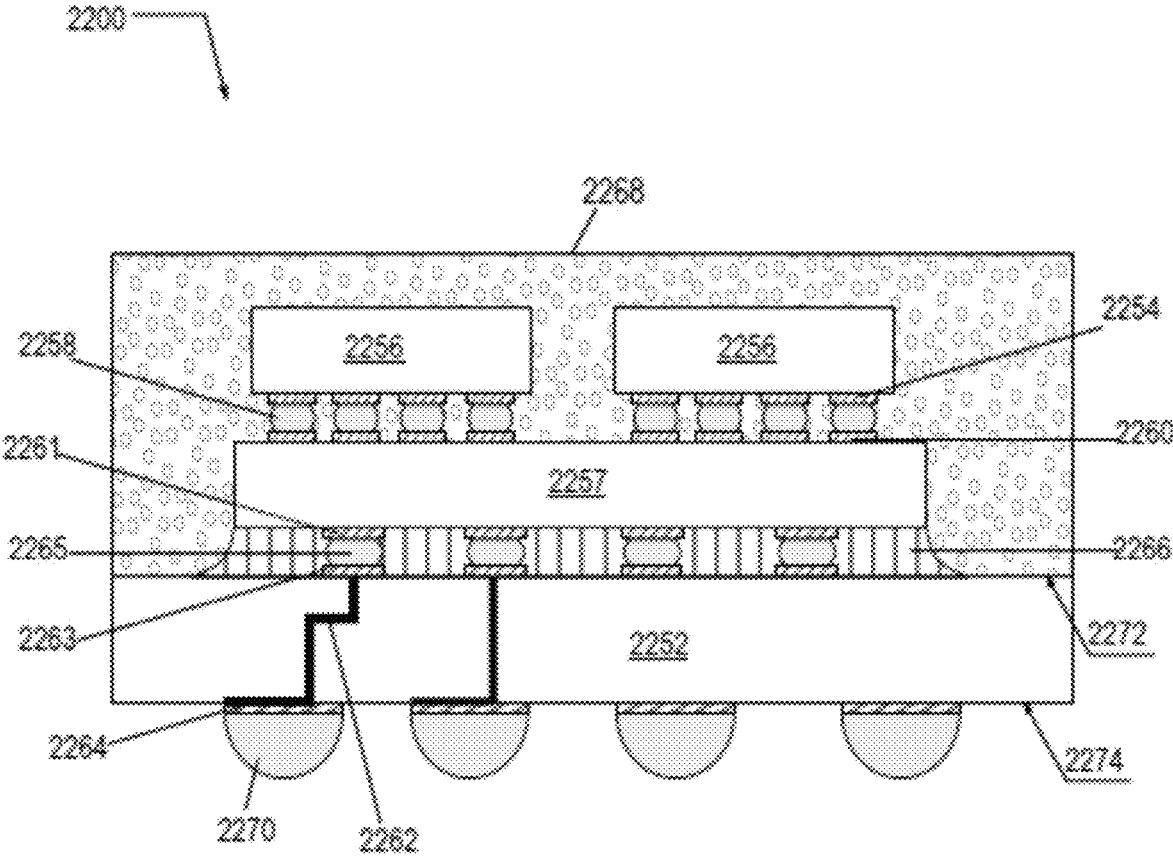
FIG. 10 is a cross-sectional view of a device package that includes one or more microelectronic assemblies in accordance with any of the embodiments disclosed herein.
Figure 11:
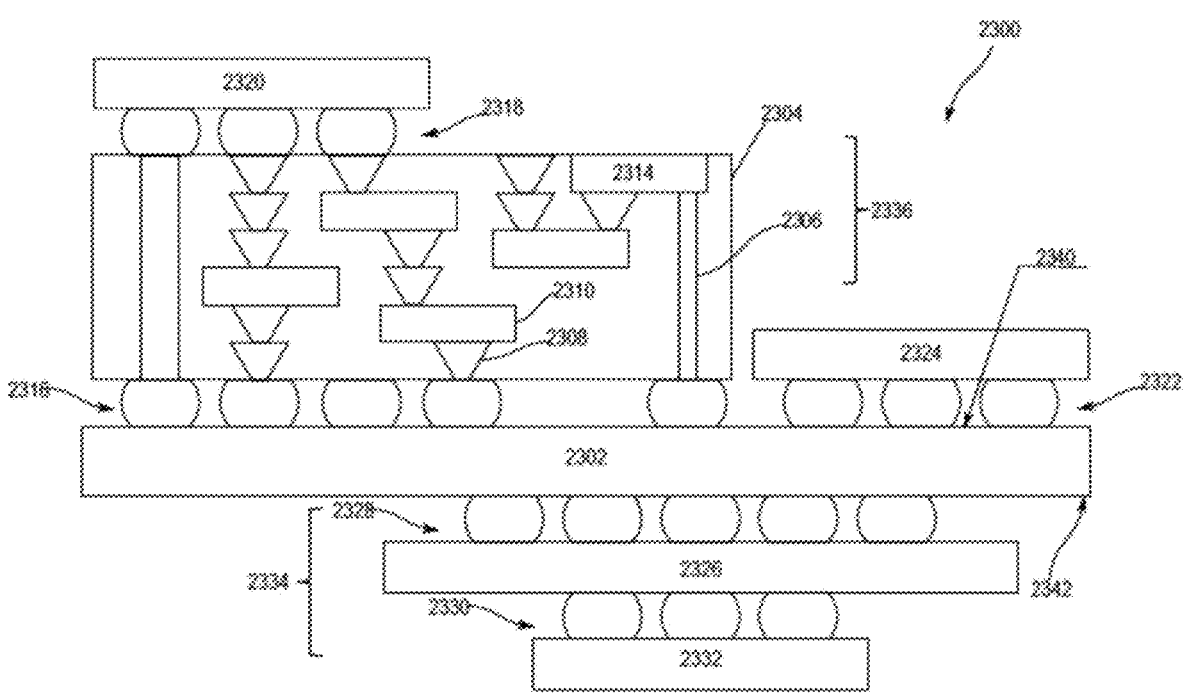
FIG. 11 is a cross-sectional side view of a device assembly that includes one or more microelectronic assemblies in accordance with any of the embodiments disclosed herein.
Figure 12:
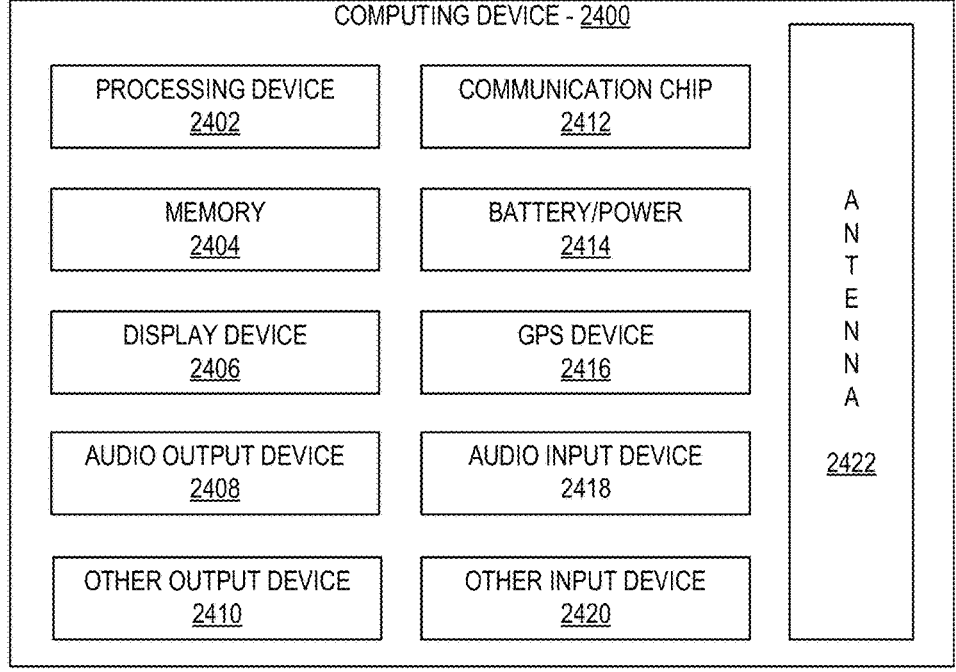
FIG. 12 is a block diagram of an example computing device that includes one or more microelectronic assemblies in accordance with any of the embodiments disclosed herein.

The packages disclosed herein, e.g., any of the microelectronic assemblies 100, 101 or any further embodiments described herein, may be included in any suitable electronic component. FIGS. 10-12 illustrate various examples of packages, assemblies, and devices that may be used with or include any of the IC packages as disclosed herein.

FIG. 10 is a side, cross-sectional view of an example IC package 2200 that may include IC packages in accordance with any of the embodiments disclosed herein. In some embodiments, the IC package 2200 may be a SiP.

As shown in the figure, package substrate 2252 may be formed of an insulator (e.g., a ceramic, a buildup film, an epoxy film having filler particles therein, etc.), and may have conductive pathways extending through the insulator between first face 2272 and second face 2274, or between different locations on first face 2272, and/or between different locations on second face 2274. These conductive pathways may take the form of any of the interconnect structures comprising lines and/or vias.

Package substrate 2252 may include conductive contacts 2263 that are coupled to conductive pathway 2262 through package substrate 2252, allowing circuitry within dies 2256 and/or interposer 2257 to electrically couple to various ones of conductive contacts 2264 (or to other devices included in package substrate 2252, not shown).

IC package 2200 may include interposer 2257 coupled to package substrate 2252 via conductive contacts 2261 of interposer 2257, first-level interconnects 2265, and conductive contacts 2263 of package substrate 2252. First-level interconnects 2265 illustrated in the figure are solder bumps, but any suitable first-level interconnects 2265 may be used, such as solder bumps, solder posts, or bond wires.

IC package 2200 may include one or more dies 2256 coupled to interposer 2257 via conductive contacts 2254 of dies 2256, first-level interconnects 2258, and conductive contacts 2260 of interposer 2257. Conductive contacts 2260 may be coupled to conductive pathways (not shown) through interposer 2257, allowing circuitry within dies 2256 to electrically couple to various ones of conductive contacts 2261 (or to other devices included in interposer 2257, not shown). First-level interconnects 2258 illustrated in the figure are solder bumps, but any suitable first-level interconnects 2258 may be used, such as solder bumps, solder posts, or bond wires. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, underfill material 2266 may be disposed between package substrate 2252 and interposer 2257 around first-level interconnects 2265, and mold 2268 may be disposed around dies 2256 and interposer 2257 and in contact with package substrate 2252. In some embodiments, underfill material 2266 may be the same as mold 2268. Example materials that may be used for underfill material 2266 and mold 2268 are epoxies as suitable. Second-level interconnects 2270 may be coupled to conductive contacts 2264. Second-level interconnects 2270 illustrated in the figure are solder balls (e.g., for a ball grid array (BGA) arrangement), but any suitable second-level interconnects 2270 may be used (e.g., pins in a pin grid array arrangement or lands in a land grid array arrangement). Second-level interconnects 2270 may be used to couple IC package 2200 to another component, such as a circuit board (e.g., a motherboard), an interposer, or another IC package, as known in the art and as discussed below with reference to FIG. 11.

In various embodiments, any of dies 2256 may be microelectronic assembly 100, 101 as described herein. In embodiments in which IC package 2200 includes multiple dies 2256, IC package 2200 may be referred to as a multi-chip package (MCP). Dies 2256 may include circuitry to perform any desired functionality. For example, besides one or more of dies 2256 being microelectronic assembly 100 as described herein, one or more of dies 2256 may be logic dies (e.g., silicon-based dies), one or more of dies 2256 may be memory dies (e.g., HBM), etc. In some embodiments, any of dies 2256 may be implemented as discussed with reference to any of the previous figures. In some embodiments, at least some of dies 2256 may not include implementations as described herein.

Although IC package 2200 illustrated in the figure is a flip-chip package, other package architectures may be used. For example, IC package 2200 may be a BGA package, such as an embedded wafer-level ball grid array (eWLB) package. In another example, IC package 2200 may be a wafer-level chip scale package (WLCSP) or a panel fan-out (FO) package. Although two dies 2256 are illustrated in IC package 2200, IC package 2200 may include any desired number of dies 2256. IC package 2200 may include additional passive components, such as surface-mount resistors, capacitors, and inductors disposed over first face 2272 or second face 2274 of package substrate 2252, or on either face of interposer 2257. More generally, IC package 2200 may include any other active or passive components known in the art.

In some embodiments, no interposer 2257 may be included in IC package 2200; instead, dies 2256 may be coupled directly to conductive contacts 2263 at first face 2272 by first-level interconnects 2265.

FIG. 11 is a cross-sectional side view of an IC device assembly 2300 that may include components having one or more microelectronic assembly 100, 101 in accordance with any of the embodiments disclosed herein. IC device assembly 2300 includes a number of components disposed over a circuit board 2302 (which may be, e.g., a motherboard). IC device assembly 2300 includes components disposed over a first face 2340 of circuit board 2302 and an opposing second face 2342 of circuit board 2302; generally, components may be disposed over one or both faces 2340 and 2342. In particular, any suitable ones of the components of IC device assembly 2300 may include any of the one or more microelectronic assembly 100, 101 in accordance with any of the embodiments disclosed herein; e.g., any of the IC packages discussed below with reference to IC device assembly 2300 may take the form of any of the embodiments of IC package 2200 discussed above with reference to FIG. 10.

In some embodiments, circuit board 2302 may be a PCB including multiple metal layers separated from one another by layers of insulator and interconnected by electrically conductive vias. Any one or more of the metal layers may be formed in a desired circuit pattern to route electrical signals (optionally in conjunction with other metal layers) between the components coupled to circuit board 2302. In other embodiments, circuit board 2302 may be a non-PCB package substrate.

As illustrated in the figure, in some embodiments, IC device assembly 2300 may include a package-on-interposer structure 2336 coupled to first face 2340 of circuit board 2302 by coupling components 2316. Coupling components 2316 may electrically and mechanically couple package-on-interposer structure 2336 to circuit board 2302, and may include solder balls (as shown), male and female portions of a socket, an adhesive, an underfill material, and/or any other suitable electrical and/or mechanical coupling structure.

Package-on-interposer structure 2336 may include IC package 2320 coupled to interposer 2304 by coupling components 2318. Coupling components 2318 may take any suitable form depending on desired functionalities, such as the forms discussed above with reference to coupling components 2316. In some embodiments, IC package 2320 may be or include IC package 2200, e.g., as described above with reference to FIG. 10. In some embodiments, IC package 2320 may include at least one microelectronic assembly 100 as described herein. Microelectronic assembly 100 is not specifically shown in the figure in order to not clutter the drawing.

Although a single IC package 2320 is shown in the figure, multiple IC packages may be coupled to interposer 2304; indeed, additional interposers may be coupled to interposer 2304. Interposer 2304 may provide an intervening package substrate used to bridge circuit board 2302 and IC package 2320. Generally, interposer 2304 may redistribute a connection to a wider pitch or reroute a connection to a different connection. For example, interposer 2304 may couple IC package 2320 to a BGA of coupling components 2316 for coupling to circuit board 2302.

In the embodiment illustrated in the figure, IC package 2320 and circuit board 2302 are attached to opposing sides of interposer 2304. In other embodiments, IC package 2320 and circuit board 2302 may be attached to a same side of interposer 2304. In some embodiments, three or more components may be interconnected by way of interposer 2304.

Interposer 2304 may be formed of an epoxy resin, a fiberglass-reinforced epoxy resin, a ceramic material, or a polymer material such as polyimide. In some implementations, interposer 2304 may be formed of alternate rigid or flexible materials that may include the same materials described above for use in a semiconductor substrate, such as silicon, germanium, and other group III-V and group IV materials. Interposer 2304 may include metal interconnects 2308 and vias 2310, including but not limited to TSVs 2306. Interposer 2304 may further include embedded devices 2314, including both passive and active devices. Such devices may include, but are not limited to, capacitors, decoupling capacitors, resistors, inductors, fuses, diodes, transformers, sensors, ESD devices, and memory devices. More complex devices such as radio frequency (RF) devices, power amplifiers, power management devices, antennas, arrays, sensors, and microelectromechanical systems (MEMS) devices may also be formed on interposer 2304. Package-on-interposer structure 2336 may take the form of any of the package-on-interposer structures known in the art.

In some embodiments, IC device assembly 2300 may include an IC package 2324 coupled to first face 2340 of circuit board 2302 by coupling components 2322. Coupling components 2322 may take the form of any of the embodiments discussed above with reference to coupling components 2316, and IC package 2324 may take the form of any of the embodiments discussed above with reference to IC package 2320.

In some embodiments, IC device assembly 2300 may include a package-on-package structure 2334 coupled to second face 2342 of circuit board 2302 by coupling components 2328. Package-on-package structure 2334 may include an IC package 2326 and an IC package 2332 coupled together by coupling components 2330 such that IC package 2326 is disposed between circuit board 2302 and IC package 2332. Coupling components 2328 and 2330 may take the form of any of the embodiments of coupling components 2316 discussed above, and IC packages 2326 and/or 2332 may take the form of any of the embodiments of IC package 2320 discussed above. Package-on-package structure 2334 may be configured in accordance with any of the package-on-package structures known in the art.

FIG. 12 is a block diagram of an example computing device 2400 that may include one or more components having one or more IC packages in accordance with any of the embodiments disclosed herein. For example, any suitable ones of the components of computing device 2400 may include a microelectronic assembly (e.g., 100) in accordance with any of the embodiments disclosed herein. In another example, any one or more of the components of computing device 2400 may include any embodiments of IC package 2200 (e.g., as shown in FIG. 10). In yet another example, any one or more of the components of computing device 2400 may include an IC device assembly 2300 (e.g., as shown in FIG. 11).

A number of components are illustrated in the figure as included in computing device 2400, but any one or more of these components may be omitted or duplicated, as suitable for the application. In some embodiments, some or all of the components included in computing device 2400 may be attached to one or more motherboards. In some embodiments, some or all of these components are fabricated onto a single SoC die.

Additionally, in various embodiments, computing device 2400 may not include one or more of the components illustrated in the figure, but computing device 2400 may include interface circuitry for coupling to the one or more components. For example, computing device 2400 may not include a display device 2406, but may include display device interface circuitry (e.g., a connector and driver circuitry) to which display device 2406 may be coupled. In another set of examples, computing device 2400 may not include an audio input device 2418 or an audio output device 2408, but may include audio input or output device interface circuitry (e.g., connectors and supporting circuitry) to which audio input device 2418 or audio output device 2408 may be coupled.

Computing device 2400 may include a processing device 2402 (e.g., one or more processing devices). As used herein, the term "processing device" or "processor" may refer to any device or portion of a device that processes electronic data from registers and/or memory to transform that electronic data into other electronic data that may be stored in registers and/or memory. Processing device 2402 may include one or more DSPs, ASICs, CPUs, GPUs, cryptoprocessors (specialized processors that execute cryptographic algorithms within hardware), server processors, or any other suitable processing devices. Computing device 2400 may include a memory 2404, which may itself include one or more memory devices such as volatile memory (e.g., dynamic random access memory (DRAM)), nonvolatile memory (e.g., read-only memory (ROM)), flash memory, solid-state memory, and/or a hard drive. In some embodiments, memory 2404 may include memory that shares a die with processing device 2402. This memory may be used as cache memory and may include embedded dynamic random access memory (eDRAM) or spin transfer torque magnetic random access memory (STT-M RAM).

In some embodiments, computing device 2400 may include a communication chip 2412 (e.g., one or more communication chips). For example, communication chip 2412 may be configured for managing wireless communications for the transfer of data to and from computing device 2400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

Communication chip 2412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), LTE project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2412 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 2412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication chip 2412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication chip 2412 may operate in accordance with other wireless protocols in other embodiments. Computing device 2400 may include an antenna 2422 to facilitate wireless communications and/or to receive other wireless communications (such as AM or FM radio transmissions).

In some embodiments, communication chip 2412 may manage wired communications, such as electrical, optical, or any other suitable communication protocols (e.g., the Ethernet). As noted above, communication chip 2412 may include multiple communication chips. For instance, a first communication chip 2412 may be dedicated to shorter-range wireless communications such as Wi-Fi or Bluetooth, and a second communication chip 2412 may be dedicated to longer-range wireless communications such as global positioning system (GPS), EDGE, GPRS, CDMA, WiMAX, LTE, EV-DO, or others. In some embodiments, a first communication chip 2412 may be dedicated to wireless communications, and a second communication chip 2412 may be dedicated to wired communications.

Computing device 2400 may include battery/power circuitry 2414. Battery/power circuitry 2414 may include one or more energy storage devices (e.g., batteries or capacitors) and/or circuitry for coupling components of computing device 2400 to an energy source separate from computing device 2400 (e.g., AC line power).

Computing device 2400 may include a display device 2406 (or corresponding interface circuitry, as discussed above). Display device 2406 may include any visual indicators, such as a heads-up display, a computer monitor, a projector, a touchscreen display, a liquid crystal display (LCD), a light-emitting diode display, or a flat panel display, for example.

Computing device 2400 may include audio output device 2408 (or corresponding interface circuitry, as discussed above). Audio output device 2408 may include any device that generates an audible indicator, such as speakers, headsets, or earbuds, for example.

Computing device 2400 may include audio input device 2418 (or corresponding interface circuitry, as discussed above). Audio input device 2418 may include any device that generates a signal representative of a sound, such as microphones, microphone arrays, or digital instruments (e.g., instruments having a musical instrument digital interface (MIDI) output).

Computing device 2400 may include a GPS device 2416 (or corresponding interface circuitry, as discussed above). GPS device 2416 may be in communication with a satellite-based system and may receive a location of computing device 2400, as known in the art.

Computing device 2400 may include other output device 2410 (or corresponding interface circuitry, as discussed above). Examples of other output device 2410 may include an audio codec, a video codec, a printer, a wired or wireless transmitter for providing information to other devices, or an additional storage device.

Computing device 2400 may include other input device 2420 (or corresponding interface circuitry, as discussed above). Examples of other input device 2420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

Computing device 2400 may have any desired form factor, such as a handheld or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, computing device 2400 may be any other electronic device that processes data.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

Example 1 is a microelectronic assembly, including an interconnect die in a first layer, the first layer having a first surface and an opposing second surface, the interconnect die surrounded by a dielectric material; a processor integrated circuit (processor IC) and an integrated circuit (IC) in a second layer, the second layer having a first surface and an opposing second surface, wherein the first surface of the second layer is at the second surface of the first layer, wherein the interconnect die is electrically coupled to the processor IC and the IC by first interconnects having a pitch of less than 10 microns between adjacent first interconnects; a photonic integrated circuit (PIC) and a substrate in a third layer, the third layer at the second surface of the second layer, wherein the PIC has an active surface, and wherein the active surface of the PIC is coupled to the IC by second interconnects having a pitch of less than 10 microns between adjacent second interconnects; and a fiber connector optically coupled to the active surface of the PIC.

Example 2 may include the subject matter of Example 1, and may further specify that the active surface of the PIC is facing towards the second surface of the second layer.

Example 3 may include the subject matter of Example 1, and may further specify that the active surface of the PIC is facing away from the second surface of the second layer.

Example 4 may include the subject matter of Example 2, and may further include a support material coupled to a lateral surface of the PIC and a top surface of the fiber connector.

Example 5 may include the subject matter of Example 4, and may further specify that the support material includes glass.

Example 6 may include the subject matter of Example 2, and may further include an optical component between the active surface of the PIC and the fiber connector, wherein optical component is optically coupled to the PIC and the fiber connector.

Example 7 may include the subject matter of Example 6, and may further specify that the optical component includes one or more of a glass block, a fiber array block, an optical lens, a planar lens, a micro-lens, a glass block with a reflector, a glass block with a curved surface, a mirror reflector, a multi-directional reflector, a glass block with an arrayed waveguide, and a laser written waveguide.

Example 8 may include the subject matter of Example 3, and may further include a through-dielectric via (TDV) in the first layer; and a thermal electric cooler (TEC) in the second layer, wherein the TEC is coupled to the TDV in the first layer and to the PIC in the third layer.

Example 9 may include the subject matter of any of Examples 1-8, and may further include a through-dielectric via (TDV) in the first layer, wherein the TDV is electrically coupled to the processor IC or the IC.

Example 10 may include the subject matter of Example 9, and may further specify that the TDV is one of a plurality of TDVs.

Example 11 may include the subject matter of any of Examples 1-10, and may further include a package substrate electrically coupled to the first surface of the first layer by solder interconnects.

Example 12 may include the subject matter of any of Examples 1-11, and may further specify that the dielectric material includes silicon and one or more of nitrogen, oxygen, hydrogen, and carbon; a polyimide material; or a low-k or ultra low-k dielectric.

Example 13 may include the subject matter of any of Examples 1-12, and may further specify that a material of the substrate includes silicon.

Example 14 is a microelectronic assembly, including an integrated circuit (IC) in a first layer, the first layer having a first surface and an opposing second surface, the IC surrounded by a dielectric material; a processor integrated circuit (processor IC) and a first portion of a photonic integrated circuit (PIC) in a second layer, the second layer having a first surface and an opposing second surface, wherein the first surface of the second layer is at the second surface of the first layer, wherein the PIC has an active surface at the second surface of the first layer, and wherein the IC is electrically coupled to the processor IC and to the active surface of the PIC by interconnects having a pitch of less than 10 microns between adjacent interconnects; a substrate and a second portion of the PIC in a third layer, the third layer at the second surface of the second layer; an optical component optically coupled to the active surface of the PIC; and a fiber connector optically coupled to the optical component.

Example 15 may include the subject matter of Example 14, and may further specify that the optical component includes one or more of a glass block, a fiber array block, an optical lens, a planar lens, a micro-lens, a glass block with a reflector, a glass block with a curved surface, a mirror reflector, a multi-directional reflector, a glass block with an arrayed waveguide, and a laser written waveguide.

Example 16 may include the subject matter of Examples 14 or 15, and may further include a through-dielectric via (TDV) in the first layer, wherein the TDV is electrically coupled to the processor IC or the PIC.

Example 17 may include the subject matter of Example 16, and may further specify that the TDV is one of a plurality of TDVs.

Example 18 may include the subject matter of any of Examples 14-17, and may further include a package substrate electrically coupled to the first surface of the first layer by solder interconnects.

Example 19 may include the subject matter of any of Examples 14-18, and may further specify that a material of the substrate includes silicon.

Example 20 may include the subject matter of any of Examples 14-19, and may further specify that the dielectric material includes silicon and one or more of nitrogen, oxygen, hydrogen, and carbon; a polyimide material; or a low-k or ultra low-k dielectric.

Example 21 may include the subject matter of any of Examples 14-20, and may further specify that the substrate is bonded to the second surface of the second layer.

Example 22 is a microelectronic assembly, including an interconnect die and a photonic integrated circuit (PIC) in a first layer, the first layer having a first surface and an opposing second surface, wherein the interconnect die and the PIC are surrounded by a dielectric material, and wherein an active surface of the PIC is at the first surface of the first layer; a processor integrated circuit (processor IC) and a through-dielectric via (TDV) in a second layer, the second layer having a first surface and an opposing second surface, wherein the first surface of the second layer is at the second surface of the first layer, wherein the processor IC and the TDV are surrounded by the dielectric material, wherein the interconnect die is electrically coupled to the processor IC by first interconnects having a pitch of less than 10 microns between adjacent first interconnects, and wherein the TDV is electrically coupled to the PIC by second interconnects having a pitch of less than 10 microns between adjacent second interconnects; an integrated circuit (IC) and a substrate in a third layer, the third layer at the second surface of the second layer, wherein the IC is coupled to the TDV by third interconnects having a pitch of less than 10 microns between adjacent third interconnects, and wherein the IC is electrically coupled to the PIC by the TDV; and a fiber connector optically coupled to the active surface of the PIC.

Example 23 may include the subject matter of Example 22, and may further specify that the TDV is one of a plurality of TDVs, and wherein at least one of the plurality of TDVs is electrically coupled the PIC at a first end and electrically coupled to the substrate at an opposing second end.

Example 24 may include the subject matter of Example 22, and may further include a dummy die including through-silicon vias (TSVs) in the second layer between the PIC in the first layer and the substrate in the third layer, and wherein the TSVs in the dummy die are electrically coupled to the PIC and the substrate.

Example 25 may include the subject matter of Example 22, and may further specify that the TDV is one of a plurality of TDVs, and the microelectronic assembly and may further include a thermal electric cooler (TEC) in the third layer, wherein at least one of the plurality of TDVs is electrically coupled the PIC at a first end and electrically coupled to the TEC at an opposing second end.

Example 26 may include the subject matter of Example 22, and may further include a TEC in the third layer; and a dummy die including TSVs in the second layer between the PIC in the first layer and the TEC in the third layer, wherein the TSVs in the dummy die are electrically coupled to the PIC and the TEC.

Example 27 may include the subject matter of Example 22, and may further include a TEC in the second and third layers, wherein the TEC is electrically coupled to the PIC.

Example 28 may include the subject matter of Example 22, and may further specify that the TDV is a second TDV, and the microelectronic assembly and may further include a first TDV in the first layer, wherein the first TDV is electrically coupled to the processor IC.

Example 29 may include the subject matter of any of Examples 22-28, and may further include a package substrate electrically coupled to the first surface of the first layer by solder interconnects.

Example 30 is a method of manufacturing a microelectronic assembly, including attaching a first layer die to a carrier; depositing a dielectric material on and around the first layer die and planarizing a top surface of the dielectric material to form a first layer; attaching second layer die to first layer die by forming first interconnects to electrically couple second layer die to first layer die, wherein the first interconnects having a pitch of less than 10 microns between adjacent first interconnects; depositing the dielectric material on and around the second layer die and planarizing a top surface of the dielectric material to form a second layer; attaching a substrate and third layer die to second layer die by forming second interconnects to electrically couple third layer die to second layer die to form a third layer, wherein the second interconnects having a pitch of less than 10 microns between adjacent second interconnects; removing the carrier; exposing an active surface of a photonic integrated circuit (PIC), wherein the PIC is a first layer die, a second layer die, or a third layer die; and optically coupling a fiber connector to the active surface of the PIC.

Example 31 may include the subject matter of Example 30, and may further specify that forming the first interconnects further includes forming an interface layer having bond-pads and a dielectric material on the first layer die, and forming metal-metal bonds and dielectric-dielectric bonds with the interface layer.

Example 32 may include the subject matter of Examples 30 or 31, and may further specify that the first layer die includes an interconnect die, the second layer die include a processor integrated circuit (processor IC) and an integrated circuit (IC), and the third layer die includes a PIC.

Example 33 may include the subject matter of Example 32, and may further specify that the active surface of the PIC faces towards the second layer die.

Example 34 may include the subject matter of Example 32, and may further specify that the active surface of the PIC faces away from the second layer die.

Example 35 may include the subject matter of Example 30, and may further specify that the first layer die includes an interconnect die and a PIC, the second layer die include a processor IC, and the third layer die include an IC.

Example 36 may include the subject matter of any of Examples 30-35, and may further include forming a through-dielectric via (TDV) in the dielectric material in the first layer, wherein the TDV is electrically coupled the second layer die.

Example 37 may include the subject matter of Example 36, and may further specify that the carrier is at a first surface of the first layer, and the method may further include electrically coupling a package substrate to the first surface of the first layer after removing the carrier.

The invention claimed is:

1. A microelectronic assembly, comprising:
an interconnect die in a first layer, the first layer having a first surface and an opposing second surface, the interconnect die surrounded by a dielectric material;
a processor circuit and an integrated circuit (IC) in a second layer, the second layer having a first surface and an opposing second surface, wherein the first surface of the second layer is at the second surface of the first layer, wherein the interconnect die is electrically coupled to the processor circuit and the IC by first interconnects having a pitch of less than 10 microns between adjacent first interconnects;
a photonic integrated circuit (PIC) and a substrate in a third layer, the third layer at the second surface of the second layer, wherein the PIC has an active surface, and wherein the active surface of the PIC is coupled to the IC by second interconnects having a pitch of less than 10 microns between adjacent second interconnects; and
a fiber connector optically coupled to the active surface of the PIC.

2. The microelectronic assembly of claim 1, wherein the active surface of the PIC is facing towards the second surface of the second layer.

3. The microelectronic assembly of claim 1, wherein the active surface of the PIC is facing away from the second surface of the second layer.

4. The microelectronic assembly of claim 2, further comprising:
a support material coupled to a lateral surface of the PIC and a top surface of the fiber connector.

5. The microelectronic assembly of claim 4, wherein the support material includes glass.

6. The microelectronic assembly of claim 2, further comprising:
an optical component between the active surface of the PIC and the fiber connector, wherein the optical component is optically coupled to the PIC and the fiber connector.

7. The microelectronic assembly of claim 6, wherein the optical component includes a glass block, a fiber array block, a waveguide, a laser written waveguide, a lens array, a pass-through structure, or a composite optical component.

8. The microelectronic assembly of claim 3, further comprising:
a through-dielectric via (TDV) in the first layer; and
a thermal electric cooler (TEC) in the second layer, wherein the TEC is coupled to the TDV in the first layer and to the PIC in the third layer.

9. The microelectronic assembly of claim 1, further comprising:
a through-dielectric via (TDV) in the first layer, wherein the TDV is electrically coupled to the processor circuit or the IC.

10. The microelectronic assembly of claim 1, further comprising:
a package substrate electrically coupled to the first surface of the first layer by solder interconnects.

11. A microelectronic assembly, comprising:
an integrated circuit (IC) in a first layer, the first layer having a first surface and an opposing second surface, the IC surrounded by a dielectric material;
a processor circuit and a first portion of a photonic integrated circuit (PIC) in a second layer, the second layer having a first surface and an opposing second surface, wherein the first surface of the second layer is at the second surface of the first layer, wherein the PIC has an active surface at the second surface of the first layer, and wherein the IC is electrically coupled to the processor circuit and to the active surface of the PIC by interconnects having a pitch of less than 10 microns between adjacent interconnects;
a substrate and a second portion of the PIC in a third layer, the third layer at the second surface of the second layer;
an optical component optically coupled to the active surface of the PIC; and
a fiber connector optically coupled to the optical component.

12. The microelectronic assembly of claim 11, wherein the optical component includes a glass block, a fiber array block, a waveguide, a laser written waveguide, a lens array, a pass-through structure, or a composite optical component.

13. The microelectronic assembly of claim 11, further comprising:
a through-dielectric via (TDV) in the first layer, wherein the TDV is electrically coupled to the processor circuit or the PIC.

14. The microelectronic assembly of claim 11, wherein the substrate is bonded to the second surface of the second layer.

15. A microelectronic assembly, comprising:
an interconnect die and a photonic integrated circuit (PIC) in a first layer, the first layer having a first surface and an opposing second surface, wherein the interconnect die and the PIC are surrounded by a dielectric material, and wherein an active surface of the PIC is at the first surface of the first layer;
a processor circuit and a through-dielectric via (TDV) in a second layer, the second layer having a first surface and an opposing second surface, wherein the first surface of the second layer is at the second surface of the first layer, wherein the processor circuit and the TDV are surrounded by the dielectric material, wherein the interconnect die is electrically coupled to the processor circuit by first interconnects having a pitch of less than 10 microns between adjacent first interconnects, and wherein the TDV is electrically coupled to the PIC by second interconnects having a pitch of less than 10 microns between adjacent second interconnects;

an integrated circuit (IC) and a substrate in a third layer, the third layer at the second surface of the second layer, wherein the IC is coupled to the TDV by third interconnects having a pitch of less than 10 microns between adjacent third interconnects, and wherein the IC is electrically coupled to the PIC by the TDV; and a fiber connector optically coupled to the active surface of the PIC.

16. The microelectronic assembly of claim 15, wherein the TDV is one of a plurality of TDVs, and wherein at least one of the plurality of TDVs is electrically coupled the PIC at a first end and electrically coupled to the substrate at an opposing second end.

17. The microelectronic assembly of claim 15, further comprising:

a dummy die including through-silicon vias (TSVs) in the second layer between the PIC in the first layer and the substrate in the third layer, and wherein the TSVs in the dummy die are electrically coupled to the PIC and the substrate.

18. The microelectronic assembly of claim 15, wherein the TDV is one of a plurality of TDVs, and the microelectronic assembly further comprising:

a thermal electric cooler (TEC) in the third layer, wherein at least one of the plurality of TDVs is electrically coupled the PIC at a first end and electrically coupled to the TEC at an opposing second end.

19. The microelectronic assembly of claim 15, further comprising:

a TEC in the third layer; and a dummy die including TSVs in the second layer between the PIC in the first layer and the TEC in the third layer, wherein the TSVs in the dummy die are electrically coupled to the PIC and the TEC.

20. The microelectronic assembly of claim 15, further comprising:

a TEC in the second and third layers, wherein the TEC is electrically coupled to the PIC.

\* \* \* \* \*